United States Patent
Kakiage

(10) Patent No.: US 6,728,806 B2
(45) Date of Patent: Apr. 27, 2004

(54) DATA PROCESSING UNIT

(75) Inventor: Toru Kakiage, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 280 days.

(21) Appl. No.: 09/876,106

(22) Filed: Jun. 8, 2001

(65) Prior Publication Data

US 2002/0013871 A1 Jan. 31, 2002

(30) Foreign Application Priority Data

Jun. 14, 2000 (JP) .................................... 2000-178210

(51) Int. Cl.[7] .............................................. G06F 13/38
(52) U.S. Cl. ......................................... 710/65; 711/167
(58) Field of Search .......................... 710/65; 711/100, 711/147, 154, 167, 169

(56) References Cited

U.S. PATENT DOCUMENTS

| | | | | |
|---|---|---|---|---|
| 5,596,564 A | * | 1/1997 | Fukushima et al. | 386/70 |
| 5,598,575 A | * | 1/1997 | Dent et al. | 710/28 |
| 5,856,962 A | * | 1/1999 | Inagawa et al. | 369/47.19 |
| 5,870,355 A | * | 2/1999 | Fujihara | 369/30.26 |
| 6,128,693 A | * | 10/2000 | Kim | 711/5 |
| 6,131,138 A | * | 10/2000 | Packer et al. | 711/4 |
| 6,295,596 B1 | * | 9/2001 | Hirabayashi et al. | 714/762 |

FOREIGN PATENT DOCUMENTS

JP          11-066761          3/1999

* cited by examiner

Primary Examiner—Jeffrey Gaffin
Assistant Examiner—David E Martinez
(74) Attorney, Agent, or Firm—Parkhurst & Wendel, L.L.P.

(57) ABSTRACT

In a data processing unit, improvement of the writing speed and efficiency of demodulated data from demodulating means into the buffer memory is achieved. As solving means thereof, writing of data demodulated in the demodulating means into the buffer memory is continuously performed after waiting for arrival of data of the same kind. Therefore, upon transfer of the demodulated data from the demodulating circuit to a temporary storage sub-means within the bus controller which controls access to the buffer memory, the kind of data of the next demodulated data is also transmitted.

22 Claims, 11 Drawing Sheets

DATA PROCESSING UNIT

BACKGROUND OF THE INVENTION

(1) Field of the Invention

The present invention relates to a data processing unit, and more particularly, the invention relates to a data processing unit which controls the temporary storage, error correction, and data transfer after correction of the demodulated data read out and sent from a storage medium, such as a CD-ROM, a music CD, or a DVD-ROM made in conformity to the CD format or the DVD format.

(2) Description of the Prior Art
(General Background Art)

The reading double speed of a DVD-ROM drive or a CD-ROM drive has recently made a great progress. As a result, there is an increasing demand for improvement of performance of the data processing unit used for decryption and error correcting signal processing of DVD format and CD format.

FIG. 1 illustrates a general configuration of a data processing unit such as this. In FIG. 1, 1 represents a demodulating circuit which demodulates the physical data read out from an optical disk medium; 2, a buffer memory serving as a buffer which temporarily stores the demodulated data sent out from the demodulating circuit for error correction and transfer to the outside (hereinafter simply referred to as the "memory" or the "storage means"); 3, an error correcting circuit which performs error detection by reading out the data stored in the memory, correcting the detected errors, and then writing back the corrected data again into the buffer memory 2; 4, an external interface circuit which reads out the corrected data from the buffer memory 2 and outputs the same to an external host PC, an SCSI (small-sized computer interface), or an interface LSI with a standard external bus such as 1394, a kind of i/f specifications; 5, a bus control circuit which controls the data transfer between a peripheral circuit such as the demodulating circuit 1, the error correcting circuit 3, or the external interface circuit 4 and the buffer memory 2; and 6, a command processing circuit which teaches the details of command to the above-mentioned components by receiving a command from the outside. (Operation of this circuit will be described later in details under the heading of "The Preferred Embodiments").

An actual data processing unit has other components such as a wobble signal detection circuit, in addition to the above, and furthermore, the error correcting circuit has a syndrome operator, resulting in a far more complicated structure, however, since these other components do not have a direct relationship with the intent of the present invention, the illustration are explanation thereof are omitted here.

The buffer memory 2 is overwritable, and the data 100 read out first are demodulated by the demodulating circuit 1, and is rewritten into the correct data as a result of the correction performed on each plural numbers of error correction by the error correction circuit 3 according to necessity. In FIG. 1, 100 and 101 represent the signal lines into which data are entered in a more accurate sense of work, however, because such an accurate expression each time might often lead to complications, and rather a simpler representation would not cause any misunderstanding, this shall also apply hereafter in this specification. And, this is also the case with other signals and pieces of the information (or lines thereof) appearing hereafter.

The reading double speed of DVD-ROM drive or CD ROM drive, i.e., the rotating speed of the optical disk is dependent upon the bus band width of this (buffer) memory. This memory generally comprises an SRAM (static random access memory) or a DRAM (dynamic random access memory) as illustrated, however, because it also serves as a cache memory for external output, it becomes necessary to provide a larger capacity, the higher the transfer rate with the outside becomes. Because of this, memory having a high recording density and available at a low cost such as a DRAM is used in many cases.

On the other hand, however, the access speed of a DRAM is lower than that of an SRAM, thereby causing a problem in the performance. Particularly, the data demodulated in the demodulating circuit are divided into usual user's data, error correcting data, and other additional information, and are written separately into the predetermined areas (address spaces) in the memory for each kind of the data. However, because data are not transferred in a predetermined sequence from the demodulating circuit, or may not be transferred at all, the execution of writing into the DRAM will be executed every time the data are transferred as a result, and therefore the high-speed access mode (page mode) of DRAM is not applicable.

(Background art having a particularly close relationship with the problems to be solved by the invention)

Accordingly, in a data processing unit as described above, the bus band width of the memory which temporarily stores the demodulated data for the purpose of error correction and transfer to the outside forms a bottleneck for the system processing performance.

Then, in order to write the demodulated data into the memory as efficiently as possible, it is proposed, for example, to provide a circuit or a memory which temporarily stores demodulated data as divided in terms of the kind of the data in the bus control circuit, and write the data for each kind of the data into the memory by use of the high-speed access mode. This practice may certainly contribute to a higher write efficiency, but will cause an increase in the hardware.

Because of this, there has been an increasing demand for the achievement of a data processing unit permitting efficient write of demodulated data into the memory by addition of only a slight amount of the hardware.

SUMMARY OF THE INVENTION

The present invention was developed in view of the problems as described above, and in the invention, the demodulated data of the same kind are written into a storage means simultaneously, or are written continuously in the transferred sequence, because the data of the same kind are stored in an area within the storage means, and particularly, the continuous data within the same kind are stored in principle in continuous addresses. For this purpose, firstly, a special communication line is provided so that the bus control circuit can recognize the kind of the demodulated data being sent in next in addition to the current modulated data. Secondly, the access requests to the storage means are also adjusted. More specifically, the details are described as follows.

In the first aspect of the invention, the demodulating means sends the data read out from the optical disk and demodulated to the bus control means for the time being in order to store into the storage means for the purpose of error correction or for using as a buffer upon transferring the same to the outside. And, in this occasion, the kind of the data to be demodulated and sent in next is also sent by use of a signal line. The kind of the data is recognized from the number of the data, the signal line, the top code of the sector, the rules of the data storage, etc.

The bus control means temporarily stores the demodulated data currently being sent, the kind of the demodulated data to be sent next, and the information specifying the same in a temporary built-in storage sub-means. When the next data kind information sent in accordance with the first demodulated data is different from a data kind of the first demodulated data currently being sent, the write control sub-means issues a request such that only the first demodulated data be written in the storage means, the write request of the first demodulated data being issued at a good timing.

The expression "issued at a good timing" means issuing a write request promptly, taking account of the time required for the bus control means to adjust write requests from various components, if there is no write request into the storage means of a higher priority, so that the demodulated data having already arrived and currently being sent can be written in the sequence of arrival without waiting for the arrival of all these data, or promptly without delay or as soon as possible after arrival of all the data.

Further, the expression "issuing a write request promptly" means accessing and writing, immediately or after arrival of all the data (a slight delay may actually occur, depending upon the clock signal or the system), upon receipt of a write enable (agree, OK) signal, the demodulated data already stored in the temporary storage sub-means at the time of receipt of the signal, or the demodulated data being sent at the time of receipt of the signal, if any.

On the other hand, if the data kinds are the same, a write request is issued at a good timing, requesting to continuously write first demodulated data being stored or having already been stored in the temporary storage sub-means and demodulated data sent immediately after the first demodulated data or to be sent, in a single access, into an area of the storage means dependent upon kind of the data, at the latest within a prescribed period of time after arrival of the next demodulated data (at least the top thereof), and these data are promptly and continuously written when the request is accepted.

This is also the case with "issuing a write request at a good timing" as same as the above.

In principle, therefore, the data are first written in the prescribed area for the data in the temporary storage sub-means, and then, the following demodulated data are written, via the temporary storage sub-means, or directly (depending upon hardware or software adopted for the unit) into the next address in the same area.

It is needless to mention that if write or read of the other data is conducted upon occurrence of the write request of the demodulated data, writing of the demodulated data must wait for the completion of such processing, or if another access request is made, adjustment is performed with the request in accordance with the priority.

It is also needless to mention that unnecessary information written in the temporary storage sub-means such as the data kind of the demodulated data and the next demodulated data stored simultaneously and the data kind of the demodulated data currently being written is erased, or eliminated by overwrite of the following demodulated data.

The data output to outside are not limited to data free from error and not covered by correction (this may not be the case with CPU programs or data for arithmetic operation) or data of which correction has fully completed, but include of course data to be processed later because of the impossibility to correct or data of which correction has been completed for the time being.

Furthermore, even within the storage means, unnecessary data such as demodulated data containing errors or demodulated data already transferred are eliminated by overwrite of corrected data or following demodulated data, or intentionally erased.

In a second aspect of the invention, the temporary storage cub-means is FIFO. It is therefore convenient when continuously transferring demodulated data of the same kind to the storage means.

It is also needless to say that the data kind of the demodulated data currently being stored may similarly be stored in FIFO, or in a separate memory.

In a third aspect of the invention, there are provided two FIFOs for continuous write of two continuous demodulated data of the same data kind in a single access as the temporary storage sub-means. When continuously writing the two demodulated data of the same data kind into the storage means, a high speed is achieved by using theses two FIFOs.

It is needless to mention that, when the data kind of the demodulated data in the first FIFO differs from that of the demodulated data to be transferred next, a request is issued to write the demodulated data in the first FIFO into the storage means. If the next demodulated data are transferred during write or during standby, storing thereof into the second FIFO may be carried out.

In a fourth aspect, many FIFO are provided, which stores the kind of demodulated data sent next, in addition to a set of the demodulated data sent to the buffer in the bus control means when temporarily storing the demodulated data into the storage means. These FIFOs are not of a strict serial type. As a result, it is possible to write, read out or output by skipping the data in some cases independently of the other FIFOs. That is, this is a bundle of FIFOs. If a prescribed number; for example two, demodulated data of the same kind are stored in these FIFOs, or stored when taking account of the demodulated data next to those currently being sent, these demodulated data of the same kind are continuously written, in a single access, in a prescribed area in the storage means (in the sequence of arrival in principle) (It is therefore possible to continuously write the already stored demodulated data and demodulated data currently being sent, making a total of two, as well as the demodulated data to be sent next, making a total or three, or the demodulated data already stored and the demodulated data to be sent next, making a total of two. This may of course be only two, depending upon the hardware or software configuration).

When the number of empty FIFOs is smaller than a prescribed value, a write request to write starting from the demodulated data having arrived first in principle into the storage means is issued, and immediately upon the bus becoming available, write into an area dependent upon the kind of the demodulated data is started.

A function of completing the write into the storage means as soon as possible by storing data of the same kind into continuously arrange FIFOs may of course be added.

The means for recognizing an empty FIFO, the means for specifying FIFOs to store the demodulated data, and the means for specifying FIFOs for the output and output sequence are directly or indirectly provided.

In a fifth aspect of the invention, the prescribed number described as to the fourth aspect is two. Data of the same kind are accessed in units of two, and continuous write is performed. The certain number of empty FIFOs for which a write request is issued when data of the same kind are not present, varying with the frequency of error correction or outside transfer, the necessary machine cycle and the frequency of transfer of the demodulated data, usually suffices to be one.

In a sixth aspect of the invention, there are provided FIFO in a number of data kinds +1. There is therefore available an increase in probability of continuous write of demodulated data of the same kind into the storage means into a prescribed area in a single access.

In a seventh aspect of the invention, the number of kinds of data to be demodulated is three, and the number of FIFOs is four.

In an eight aspect of the invention, if demodulated data of the same kind as the demodulated data currently being written into the storage means are sent from the demodulating means to the bus control means, such data are also written continuously.

In a ninth aspect of the invention, write of the demodulated data into continuous addresses to the storage means (conceptually) comprises only movement to the next address (present at the top and bottom or right and left) of write means (arm). The necessity to move to a distant write address is therefore eliminated. It is therefore possible to conduct data write in a high speed mode.

In a tenth aspect of the invention, although similar to the fourth aspect the FIFOs store only the demodulated data. The data kind of the demodulated data is separately stored, and the data kind of the demodulated data sent next, which is used for determination for only a single access, is not stored for a long period of time.

Figure 1:
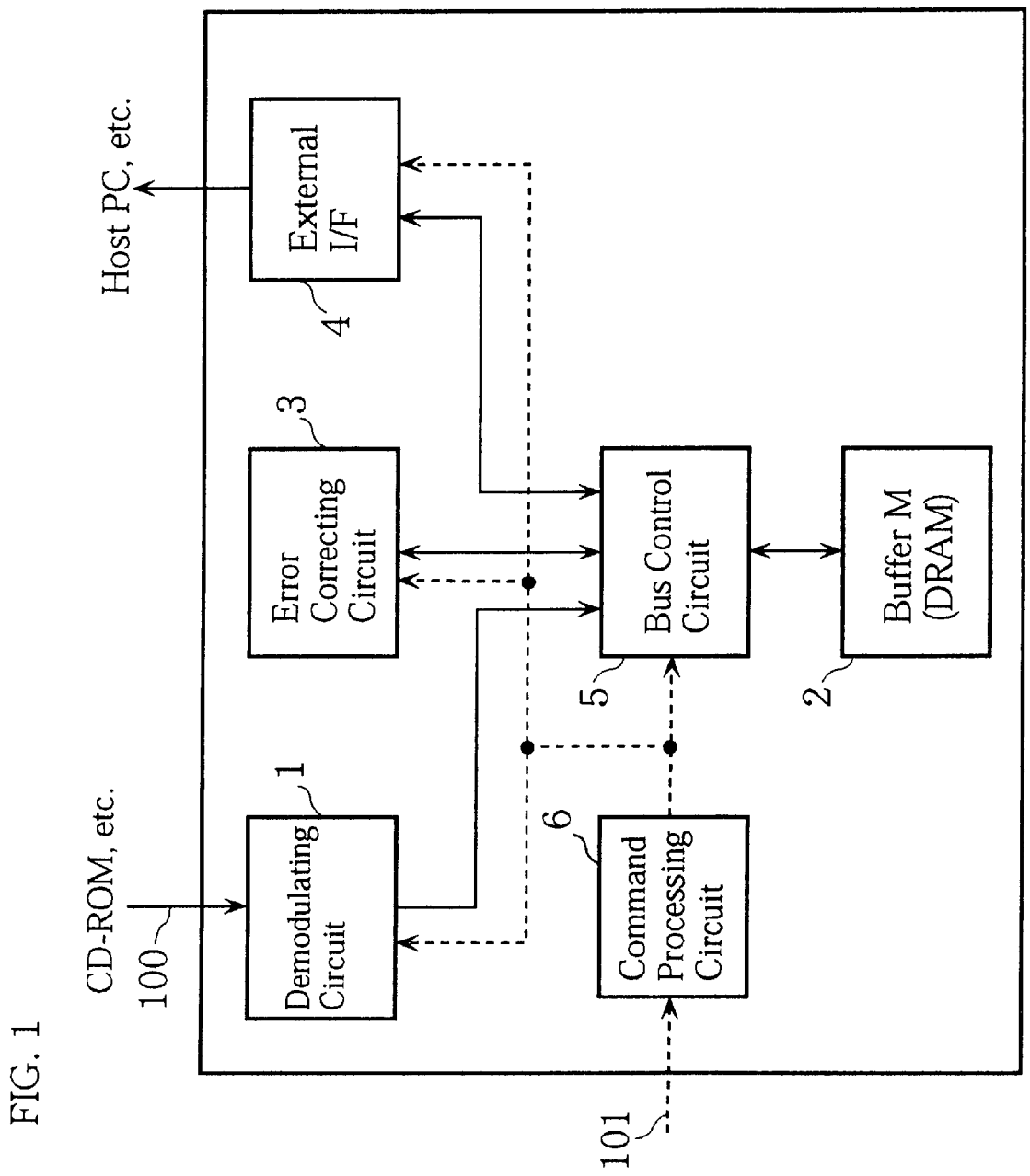
FIG. 1 is a configuration diagram of a conventional data processing unit.

| (Reference numerals) | |
|---|---|
| 1: | Demodulating circuit |
| 2: | Buffer memory |
| 3: | Error correcting circuit |
| 4: | External I/F |
| 5: | Bus control circuit |
| 6: | Command processing circuit |
| 20: | FIFO control circuit |
| 21: | (Multi-stage) FIFO |
| 22: | Adjusting circuit |

| -continued | |
|---|---|
| (Reference numerals) | |
| 23: | Access signal generating circuit |
| 24: | Address signal generating circuit |
| 25: | Data interface |
| 200: | First-stage FIFO write control signal |
| 201: | First-stage FIFO information |
| 202: | Second-stage FIFO write control signal |
| 203: | Second stage FIFO information |
| 204: | Third-stage FIFO write control signal |
| 205: | Third-stage FIFO information |
| 206: | Fourth-stage FIFO write control signal |
| 207: | Fourth-stage FIFO information |
| 208: | Demodulated data write request signal |
| 209: | Write ID signal |
| 2010: | Result of adjustment |
| 210: | FIFO main body |
| 211: | First-stage FIFO |
| 212: | Second-stage FIFO |
| 213: | Third-stage FIFO |
| 214: | Fourth FIFO |
| 215: | Data write arm |
| 216: | Data readout arm |
| 100: | Input data |
| 101: | Command |
| 102: | Demodulated data |
| 103: | Demodulated data strobe |
| 104: | NID |
| 105: | NID strobe |
| 106: | Error correction data request |
| 107: | Correction/rewrite request |
| 108: | Error correction data |
| 109: | Host data request |
| 110: | Host data |
| 111: | Command specifying signal |
| 112: | RAS |
| 113: | CAS |
| 114: | WE |
| 115: | DRAM address |
| 116: | DRAM data |
| 117: | Host output data |

DESCRIPTION OF THE PREFERRED EMBODIMENTS

Embodiments of the present invention will now be described.

Figure 2:
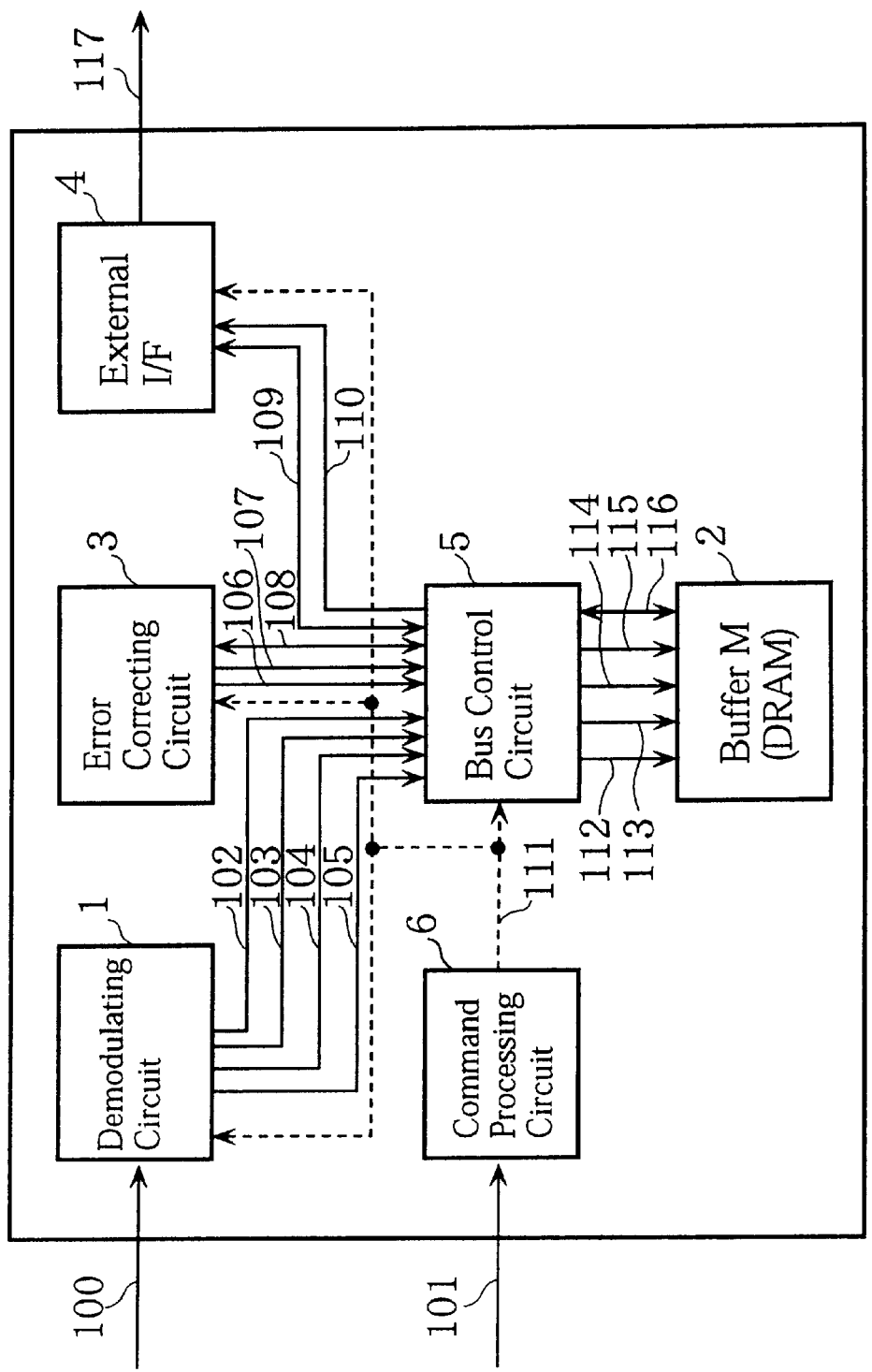
FIG. 2 is a configuration diagram of the data processing unit of a first embodiment of the present invention.

FIG. 2 schematically illustrates the basic configuration of the data processing unit of the invention. In FIG. 1, the same components (parts and constituents) as in the conventional art, or components having the same functions except for those of the invention will be assigned the same reference numerals.

Although not a few points are similar to those in the conventional art, operation of a command processing circuit of the data processing unit of the invention will be described. In this embodiment, a clock synchronous type DRAM is used as the buffer memory 2.

The command processing circuit 6 interprets a command 101, and instructs the following operations to individual internal circuits of the data processing unit:

(1) Demodulation;

(2) Error correction; and (3) Data transfer to host PC.

The term "demodulation" means a processing comprising demodulating entered data and writing the demodulated data into a buffer memory 2. For the purpose of efficiently accomplishing error correction or transfer to the host PC later, data are stored (temporarily stored) in an address in a predetermined area for each data kind. In the case of a CD-ROM or a music CD, for example, data kinds are divided into a data section having actual data, an erasure flag which is an error correcting flag, and a sub-code representing additional information for music.

The term "error correction" means a processing of reading in (digital data) stored in the buffer memory 2, detecting presence of an error, and if present, the position thereof, then correcting the error, and overwriting the corrected data in the buffer memory. The term "data transfer to host" means a processing comprising outputting data in the buffer memory of which the error has been completely corrected or corrected for the time being in the case of, for example, image data, to the host side. The error correction itself, being a known technique, is not described here.

The operation thereof will now be described as follows.

When demodulation is instructed by the command 101, the command processing circuit 6 instructs the demodulating circuit 1 and the bus control circuit 5 to perform demodulation by means of a command specifying signal 111. In the demodulating circuit 1, the input data 100 is demodulated, and arranging by data kind, sends the demodulated data 102, a modulated data strobe 103, an NID (next ID: next identification code) 104 showing the kind of the data transferred next, and an NID strobe 105 which is a signal showing that this is a meaningful NID to the bus control circuit 5. In the bus control circuit 5, the demodulated data are written in the sequence of prescribed addresses in an area dependent upon the kind of data in the buffer memory 2.

When the command 101 instructs error correction, the command processing circuit 6 instructs error correction to the error correcting circuit 3 and the bus control circuit 5 by means of a command instructing signal 111. An error correction data request 106 is sent from the error correcting circuit 3 to the bus control circuit 5. In the bus control circuit 5, data are read out from the buffer memory 2, and the read data 108 for error correction are sent to the error correcting circuit 3. In the error correcting circuit 3, an error is detected, and if an error is detected, the position thereof is detected to carry out error correction. A correction/rewrite request 107 and data of which the error has been processed and corrected (represented by 108 because the same signal line is used) are sent to the bus control circuit 5. In the bus control circuit 5, the data having been corrected in principle to the original address of the original area of the buffer memory 2 are overwritten.

Further, when data transfer to the host PC is instructed by the command 101, the command processing circuit 6 issues an instruction to the external I/F 4 and the bus control circuit 5 by means of the command instruction signal 111. In the external I/F 4, when the data are ready for transfer, a host data request (signal) 109 is sent to the bus control circuit 5. In the bus control circuit 5, the corrected data from the buffer memory 2 is transferred to the external I/F 4 as host data 110. The external I/F 4 outputs this host output data 117 to the outside.

The bus control circuit 5 outputs, after adjustment of access requests to the individual buffer memories 2, RAS 112 which is a low-address strobe signal to the DRAM, CAS 113 which is a column address strobe signal, a WE (write enable) 114, and a DRAM address 115 to the buffer memory 2, and makes an access to the buffer memory 2 via a DRAM data 116.

Processing and operation of the present invention of this data processing unit will now be described as follows.
(First Embodiment)

This embodiment covers a case where FIFOs are provided in the two stages for continuously transferring the two demodulated data of the same kind to the buffer memory.

Figure 3:
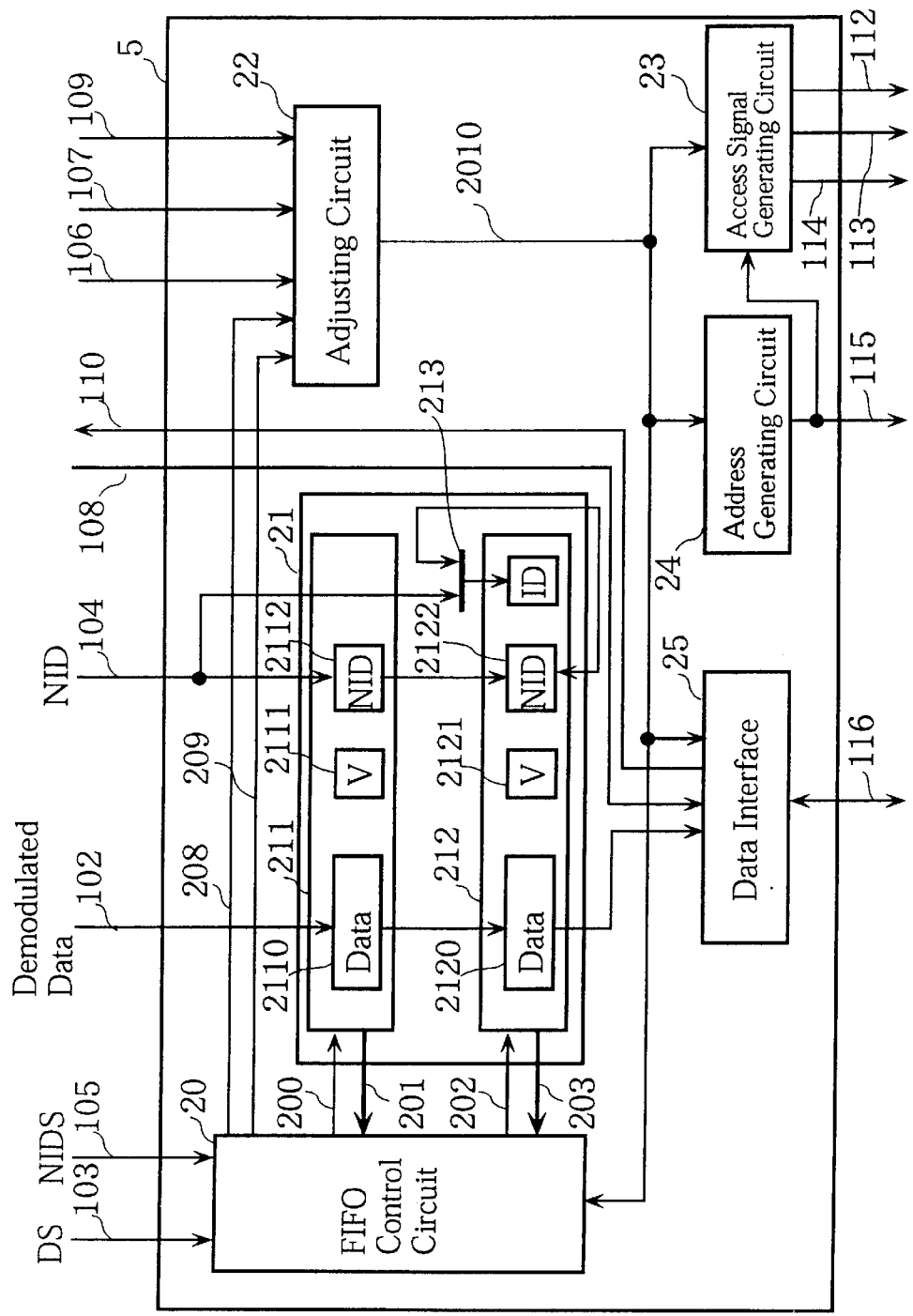
FIG. 3 is a configuration diagram of the bus control circuit of the data processing unit shown in FIG. 2.

FIG. 3 schematically illustrates a configuration of the bus control circuit of the data processing unit of this embodiment. This bus control circuit 5 comprises an FIFO control circuit 20, an FIFO 21 storing demodulated data, an adjusting circuit 22 which adjusts accesses to the buffer memory (not shown in FIG. 3), an access signal generating circuit 23 which generates an address signal to the buffer memory 2, an address generating circuit 24, and a data interface 25.

Furthermore, the FIFO 21 has two stages comprising a first-stage FIFO 211, a second FIFO 212 and a selector 213.

The first-stage FIFO (or the first FIFO) 211 comprises a data section (part) 2110 which stores demodulated data, a validating section (V) 2111 showing that data stored in the data section 2111 are valid (correct or effective), and a next ID section (NID) 2112 which indicates the kind of the next data (storing signals and information to that effect) transferred from the demodulating circuit 11.

The second-stage FIFO 212 comprises a data section 2120 which stores demodulated data, a validating section 2121 which validates data stored in the data section, a next ID section 2122 which identifies the kind of data transferred next from the demodulating circuit 11, and an ID (identification code) section (ID) 2123 which shows the kind of data stored in the data section 2120.

The FIFO control circuit 20 generates a first-stage FIFO write control signal 200 and a second-stage FIFO write control signal 202 on the basis of first-stage FIFO information 201 representing the status of the first-stage FIFO 211 and second-stage FIFO information representing the status of the second-stage FIFO 212, thereby controlling write into the FIFO 21.

Further, the FIFO control circuit 20 outputs a demodulated data write request signal 208 requesting write of the demodulated data stored in the FIFO 21 into the buffer memory 2, and a write ID signal 209 indicating what kind of demodulated data a write request signal covers to the adjusting circuit 22.

Upon receipt of the demodulated data write request signal 208, the write ID signal 209, the error correction data request 106, the correction rewrite request 107 and the host data request 109, the adjusting circuit 22 adjusts accesses to the buffer memory 2 in accordance with a predetermined adjusting sequence, and outputs the result of adjustment 2010 to the FIFO control circuit 20, the access signal generating circuit 23, the address generating circuit 24 and the data interface 25.

Next, operation of the data processing unit shown in FIGS. 2 and 3 will now be described specifically further in detail with reference to FIGS. 4 and 5.

Figure 4:
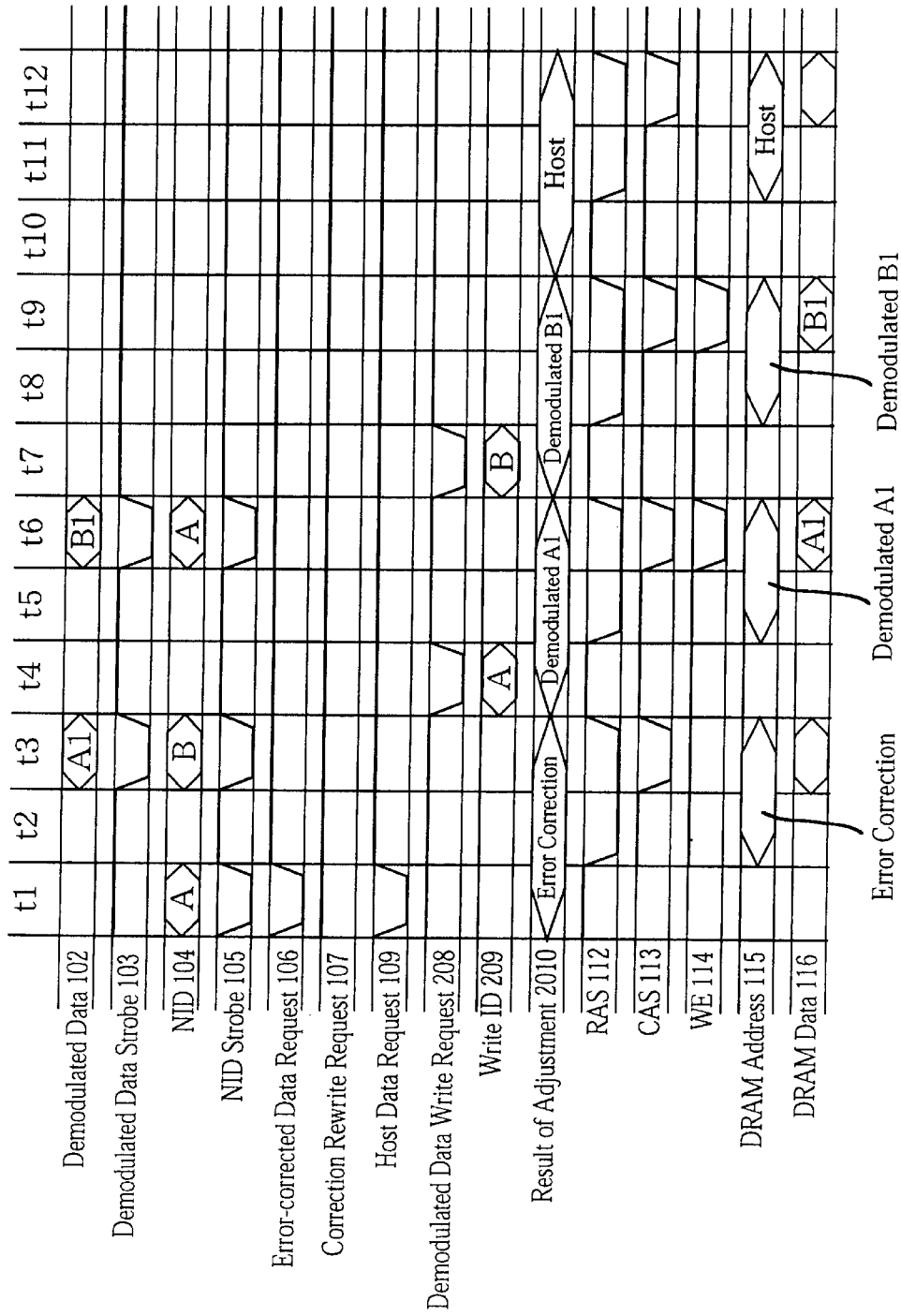
FIG. 4 is an operating timing chart of the data processing unit having the bus control circuit shown in FIG. 3.
Figure 5:
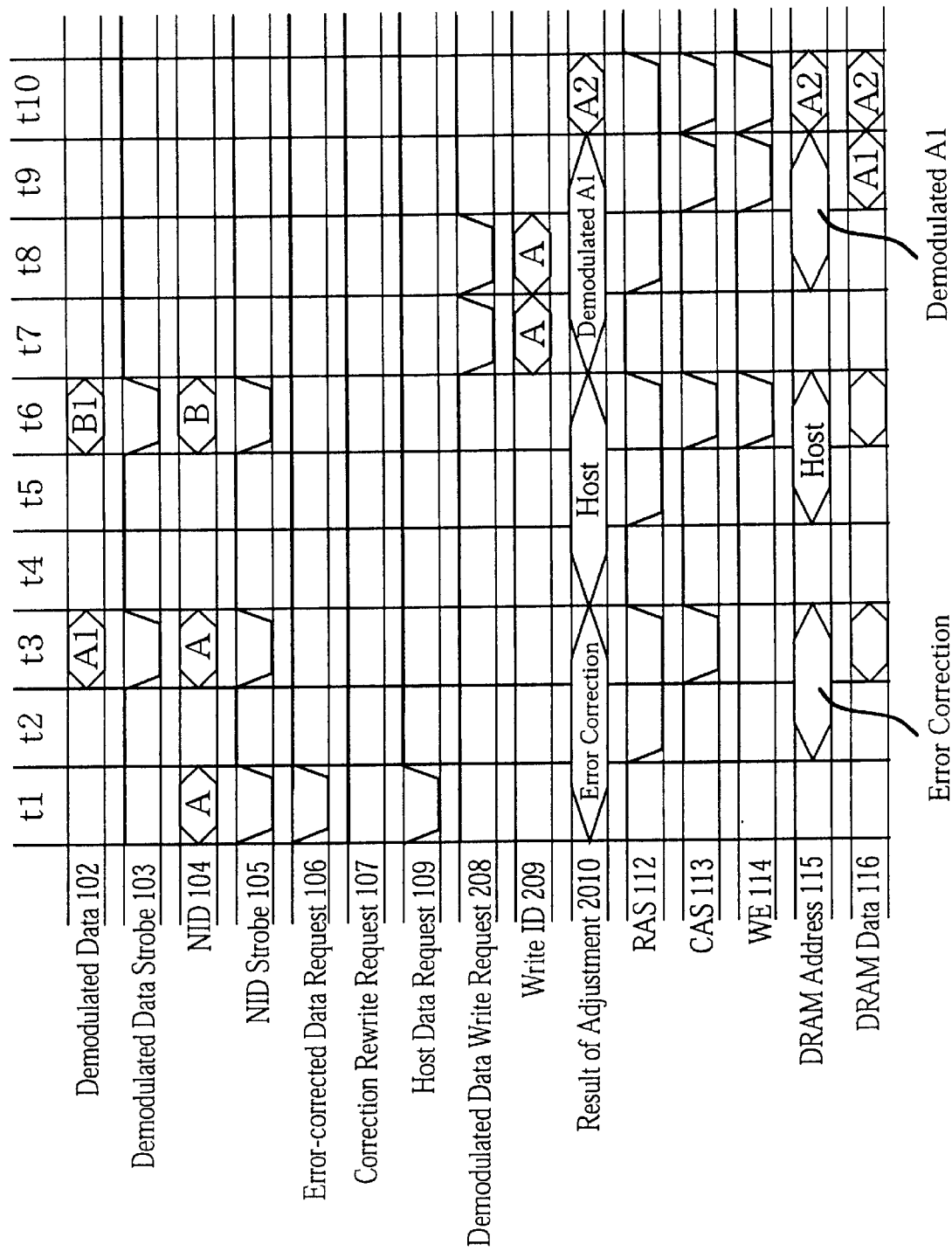
FIG. 5 is another operating timing chart of the data processing unit having the bus control circuit shown in FIG. 3.

FIGS. 4 and 5 are timing charts of this data processing unit, and show, in units of machine cycle, the access status to the buffer memory 2 of the demodulated data 102, the demodulated data strobe 103, the NID 104, the NID strobe 105, the error correction data request 106, the correction rewrite request 107, and the host data request 109, as output from the demodulating circuit 1 shown in FIGS. 2 and 3 to the bus control circuit 5. All these signals are active low signals showing that they are asserted on a low signal level.

An access to the buffer memory 2 is adjusted at the adjusting circuit 22 and then, executed with three machine cycles for an ordinary access, and with one machine cycle when using the high-speed access mode (DRAM page mode) of the buffer memory 16 with continuous addresses.

Further, the demodulated data 102 covers a case with two data kinds A and B, which are written in different areas of the buffer memory, respectively, and data of the same kind are written in the high-speed access mode into continuous addresses in the area for that data kind on the buffer memory.

The priority of adjustment in the adjusting circuit 22 is in the order of: (1) writing of demodulated data; (2) readout of error-corrected data; (3) rewriting corrected data; and then, (4) readout of host data. Adjustment is made at the start of the next access. For hardware efficiency, the bus width is identical for the demodulated data 102, the error-corrected data 108, the host data 110 and the DRAM data 116, and access to the buffer memory should be completed in a single run of access. The demodulated data is given the highest priority because it is impossible to cause data read out from an optical disk to wait for the others unlike internal data. The priority for the other data is determined, taking account of the actual conditions including frequency and empirical factors since error correction is made for all the data.

FIG. 4 illustrates access to the buffer memory 2 in four runs of access in total in a case where data kinds of continuous demodulated data 102 are different from each other, including two runs of write into the buffer memory, each one run of assertion for the error-corrected data request 106 and the host data request 109, and a run of read of data from the buffer memory.

Operation of the data processing unit will now be described for each of the machine cycles (t1) to (t13) along with the lapse of time in the horizontal direction in FIGS. 4 and 5. To facilitate viewing the contents of the demodulated data FIFO 21 at a point in time for each cycle, the contents are shown at the end of the specification, not in the form of a diagrammatic table independent of the specification (printed on a separate sheet), but in the form of a table forming a part of the specification. The table does not contain cycles not different from the preceding cycle condition.

FIRST EXAMPLE

The example covers a case where the kinds of the two demodulated data are different as shown in FIG. 4.

(t1) NID 104=A showing that the kind of the next output demodulated data is A and NID strobe 105 are asserted from the demodulating circuit 1 to the bus control circuit 5. The error correction data request 106 is asserted from the error correcting circuit, and the host data request 109 is asserted from the external I/F 4.

In the bust control circuit 5, the second-stage FIFO write control signal 202 is output from the FIFO control circuit 20. The NID 104 is selected at the selector 213:A is Written in the ID section 2123 of the second-stage FIFO 212, and A is written also in the NID section 2112 of the first-stage FIFO 211. At the selector 213, the NID 104 is selected only in the first run, and subsequently, a value stored in the NID section 2122 of the second-stage FIFO 212 is selected. The demodulated data have not as yet been sent to the FIFO 21 at this point, leading to absence of valid data. As a result, the two validating sections (V) 2111 and 2121 are in the initial state of 0.

In the adjusting circuit 22, adjustment processing is conducted between the error-corrected data request 106 and the host data request 109. Since the error-corrected data request has a higher priority, the error-corrected data request is accepted, and the host data request is in waiting state. The result of adjustment 2010 is output from the adjusting circuit 22 to the access signal generating circuit 23, the address generating circuit 24, and the data interface 25, and as shown by 205 in FIG. 4, read operation of the error-corrected data of up to three machine cycles from the buffer memory 2 is started. The contents of the first-stage and second-stage FIFOs in this state as described above are shown in the form of a table.

(Table-form description of the t1 status)

| | Data section | V | NID | ID |
|---|---|---|---|---|
| First-stage FIFO 211 | — | 0 | A | — |
| Second-stage FIFO 212 | — | 0 | — | A |

(t2) The access signal to the buffer memory 2 to the error-corrected data request 106 is generated in the access signal generating circuit 23, and an RAS 112 is asserted. The read address of the error-corrected data is selected in the address generating circuit 24, and a DRAM address 115 is output.

(t3) The demodulated data strobe 103 is asserted from the demodulating circuit 1 to the bus control circuit 5, and the demodulated data 102 (this data, being the first of the kind A, is referred to as "A1") is output. Simultaneously with this, the NID 104=B showing that the kind of the next demodulated data is B, and the NID strobe 105 are asserted. In the bus control circuit 5, the first-stage FIFO write control signal 200 is output from the FIFO control circuit 20, and A1 is written in the data section 2110 of the first-stage FIFO 211; 1 is written in the validating section (V) 2111; and B is written in the NID section 2112, all in a machine cycle (within this t3).

The CAS 113 is asserted from the access signal generating circuit 23; the DRAM data 116 is output from the buffer memory 2; and the read operation of the error-corrected data is completed.

(Table type description of t3 status)

| | Data section | V | NID | ID |
|---|---|---|---|---|
| First-stage FIFO 211 | A1 | 1 | B | — |
| Second-stage FIFO 212 | — | 0 | — | A |

(t4) In the bus control circuit 5, the error-corrected data 108 held by a built-in latch not shown in transferred to the error correcting circuit 3 via the data interface 25. The second-stage FIFO write control signal 202 is output from the FIFO control circuit 20. The content A1 of the data section of the first-stage FIFO 211 is written in the data section 2120 of the second-stage FIFO 212; 1 is written in the validating section (V) 2121; and the content B of the NID section of the first-stage FIFO 211 is written in NID section 2122.

Simultaneously with this, the validating section (V) 2111 of the first-stage FIFO 211 is cleared to 0, which represents a stage in which no valid data is present. At this point, in the FIFO circuit 20, the demodulated data write request 208 and the write ID signal 209 are asserted to the adjusting circuit 22 without waiting for transfer of the data to be sent in next, because the presence of the valid data in the second-stage FIFO is known from the second-stage FIFO information signal 203, and the data kind of the stored data (ID=A) is different from that of the data transferred next (NID=B).

In the adjusting circuit 22, adjustment is made between the host data request 109 in waiting state and the demodulated data write request 208. Since the demodulated data write request has a higher priority, the demodulated data write request is accepted, and the host data request is in waiting state. The result of adjustment 2010 is output from the adjusting circuit 22 to the access signal generating circuit 23, the address generating circuit 24, and the data interface 25, and read of the demodulated data A1 in the buffer memory 2 is started. This is represented by 115.

(Table-form description of state t4)

|  | Data section | V | NID | ID |
|---|---|---|---|---|
| First-stage FIFO 211 | — | 0 | — | \ |
| Second-stage FIFO 212 | A1 | 1 | B | A |

(t5) The access signal for the demodulated data write request 208 to the buffer memory 2 is generated at the access signal generating circuit 23, and the RAS 112 is asserted. In the address generating circuit 24, the write address of the demodulated data of kind A is selected, and the DRAM address 115 is output.

(t6) The modulated data strobe 103 is asserted from the demodulating circuit 1 to the bus control circuit 5, and the demodulated data 102 (data is referred to as B1) is output. Simultaneously with this, the NID 104=A showing that the data kind of the next demodulated data 102 is A and the NID strobe 105 are asserted.

In the bus control circuit 5, the first-stage FIFO write control signal 200 is output from the FIFO control circuit 20. B1 is written from the FIFO control circuit 20 in data section of the first-stage FIFO 211; 1 is written in the validating section (V); and A is written in the NID section 2112, respectively. The CAS 1113 and the WE 114 are asserted from the access signal generating circuit 23. The data A1 written from the data interface 25 into the buffer memory 2 is output to the DRAM data 116, thus completing write operation of the demodulated data.

(Table-form description of t6 status)

|  | Data section | V | NID | ID |
|---|---|---|---|---|
| First-stage FIFO 211 | B1 | 1 | A | \ |
| Second-stage FIFO 212 | A1 | 1 | B | A |

(t7) Because write of data of the second-stage FIFO has been completed in the preceding cycle, the second-stage FIFO write control signal 202 is output from the FIFO control circuit 20. The content B1 of the data section of the first-stage FIFO 211 is written in the data section 2120 of the second-stage FIFO 212; 1 is written in the validating section (V) 2121; the content A of the NID section of the first-stage FIFO 211 is written in the NID section 2122; the value of the NID section 2122 of the preceding cycle is selected at the selector 213, and B is written in the ID section 2123, respectively.

Simultaneously, the validating section (V) 2111 of the first-stage FIFO 211 is cleared to 0, which represents the state in which there is no valid data. At this point, the FIFO control circuit 20 asserts the demodulated data write request 208 and the write ID signal 209 to the adjusting circuit 22 without waiting for transfer of the next data, because presence of valid data in the second-stage FIFO is known from the second-stage FIFO information signal 203, and the data kind of the stored data (ID=B) is different from that of the data transferred next (NID=A).

In the adjusting circuit 22, adjustment is made between the host data request 109 in waiting state and the demodulated data write request 208. Since the demodulated data write request has a higher priority, the demodulated data write request is accepted, and the host data request is in waiting state. The result of adjustment 2010 is output from the adjusting circuit 22 to the access signal generating circuit 23, the address generating circuit 24, and the data interface 25, and read of the demodulated data B1 up to the t9 cycle in the buffer memory 2 is started.

(Table-form description of t7 status)

|  | Data section | V | NID | ID |
|---|---|---|---|---|
| First-stage FIFO 211 | — | 0 | — | \ |
| Second-stage FIFO 212 | B1 | 1 | A | B |

(t8) The access signal for the demodulated data write request 208 to the buffer memory 2 is generated at the access signal generating circuit 23, and the RAS 112 is asserted. In the address generating circuit 24, the write address of the demodulated data of kind B is selected, and the DRAM address 115 is output.

(t9) The CAS 113 and the WE 114 are asserted from the access signal generating circuit 23, and the data B1 written from the data interface 25 in the buffer memory 2 is output to the DRAM data 116, thus completing write of the demodulated data B1.

(t10) Since write of the demodulated data has been completed in the preceding cycle, the validating section 2121 of the second-stage FIFO is reset to 0, and the value of the NID section 2122 is written in the ID section 2123. The host data request 109 in waiting state is accepted in the adjusting circuit 22, and read operation of the host data for three cycles from the buffer memory 2 is started.

(Table-form description of t10 status)

|  | Data section | V | NID | ID |
|---|---|---|---|---|
| First-stage FIFO 211 | — | 0 | A | \ |
| Second-stage FIFO 212 | — | 0 | — | A |

(t11) The access signal for the error-corrected data request 106 to the buffer memory is generated at the access signal generating circuit 23, and the RAS 112 is asserted. The reads address of the error-corrected data is selected in the address generating circuit 24, and the DRAM address 115 is output.

(t12) The CAS 113 is asserted from the access signal generating circuit 23. The DRAM data 116 is output from the buffer memory 2, thus completing the read operation of the host data.

(t13) In the bus control circuit, the host data 110 is transferred to the external I/F 4 via the data interface 25.

SECOND EXAMPLE

This example covers a case where the two demodulated data are of the same data kind as shown in FIG. 5.

FIG. 5 illustrates operations upon accessing the buffer memory in four runs in total including two write requests into the buffer memory and each one run of assertion of the error-corrected data request 106 and the host data request 109 to read out the data from the buffer memory 2, when the continuous demodulated data are of the same data kind. Operations of the individual components of the data processing unit for each machine cycle will now be described along with the lapse of time, as in the case shown in FIG. 4.

(t1) The NID 104=A showing that the data kind of the demodulated data to be output next is A, and the NID strobe 105 are asserted from the demodulating circuit 1 to the bus control circuit 5. Ten error-corrected data request 106 is asserted from the error correcting circuit 3, and the host data request 109 is asserted from the external I/F 4.

In the bus control circuit 5, the second-stage FIFO write control signal 20 is output from the FIFO control circuit 20. The NID 104 is selected at the selector 213. A is written in the ID section 2123 of the second-stage FIFO 212, and A is written in the NID section 212 of the first-stage FIFO 211. In this embodiment as well, NID 104 is selected by the selector 213 only once at the start, and subsequently, a value stored in the NID section 2122 of the second-stage FIFO 212 is selected.

Further, the demodulated data has not as yet been sent to the FIFO 21, so that there is no valid data. As a result, both the two validating sections (V) 2111 and 2121 take a value of O which represents the initial condition. In the adjusting circuit 22, adjustment is made between the error-corrected data request 106 and the host data request 109. Because the error-corrected data request has a higher priority, the error-corrected data request is accepted, and the host data request is in waiting state. The result of adjustment 2010 is output from the adjusting circuit 22 to the access signal generating circuit 23, the address generating circuit 24, and the data interface 25, and readout of the error-corrected data from the buffer memory 2 of up t3 cycle is started.

(Table-form description of t1 status)

|  | Data section | V | NID | ID |
| --- | --- | --- | --- | --- |
| First-stage FIFO 211 | — | 0 | A | \ |
| Second-stage FIFO 212 | — | 0 | — | A |

(t2) The access signal to the buffer memory 2 to the error-corrected data request 106 is generated in the access signal generating circuit 23, and an RAS 112 is asserted. The read address of the error-corrected data is selected in the address generating circuit 24, and a DRAM address 115 is output.

(t3) The demodulated data strobe 103 is asserted from the demodulating circuit 1 to the bus control circuit 5, and the demodulated data 102 (this data is referred to as "A1") is output. Simultaneously with this the NID 104=A showing that the kind of the next demodulated data is A, and the NID strobe 105 are asserted.

In the bus control circuit 5, the first-stage FIFO write control signal 200 is output from the FIFO control circuit 20, and A1 is written in the data section 2110 of the first-stage FIFO 211; 1 is written in the validating section (V) 2111; and A is written in the NID section 2112. The CAS 113 is asserted from the access signal generating circuit 23; The DRAM data 116 is output from the buffer memory 2; and the read operation of the error-corrected data is completed.

(Table-form description of t3 status)

|  | Data section | V | NID | ID |
| --- | --- | --- | --- | --- |
| First-stage FIFO 211 | A1 | 1 | A | \ |
| Second-stage FIFO 212 | — | 0 | — | A |

(t4) In the bus control circuit 5, the error-corrected data 108 is transferred to the error correcting circuit 3 via the data interface 25. The second-stage FIFO write control signal 202 is output from the FIFO control circuit 20. The content A1 of the data section of the first-stage FIFO 211 is written in the data section 2120 of the second-stage FIFO 212; 1 is written in the validating section (V) 2121; and the content A of the NID section of the first-stage FIFO 211 is written in the NID section 2122.

Simultaneously with this, the validating section (V) 2111 of the first-stage FIFO 211 is cleared to O, which represents a state in which no valid data is present. At this point, the FIFO control circuit 20 does not assert the demodulated data write request 208, but waits for transfer of the next data, because presence of valid data in the second-stage FIFO is known from the second-stage FIFO information signal 203, and the data kind of the stored data (ID=A) is the same as that of the data transferred next (NID=A).

In the adjusting circuit 22, the host data request 109 in the waiting state is accepted, and read operation of the host data from the buffer memory 2 is started for these cycles up to t6 cycle.

(Table-form description of t4 status)

|  | Data section | V | NID | ID |
| --- | --- | --- | --- | --- |
| First-stage FIFO 211 | — | 0 | — | \ |
| Second-stage FIFO 212 | A1 | 1 | A | A |

(t5) The access signal for the host data request to the buffer 2 is generated at the access signal generating circuit 23, and the RAS 112 is asserted. In the address generating circuit 24, the read address of the host data is selected, and the DRAM address 115 is output.

(t6) The CAS 113 is asserted from the access signal generating circuit 23, and the DRAM data 116 is output from the buffer memory 2, thus completing the readout operation of the host data.

The demodulated data strobe 103 is asserted from the demodulating circuit 1 to the bus control circuit 5, and the demodulated data 102 (data is referred to as "A2") is output. Simultaneously with this, the NID 104=B showing that the data kind of the next demodulated data 102 is A, and the NID strobe 105 are asserted. In the bus control circuit 5, the first-stage FIFO write control signal 200 is output from the FIFO control circuit 20. A2 is written from the FIFO control circuit 20 in the data section 2110 of the first-stage FIFO 211; 1 is written in the validating section (V); and B is written in the NID section 2112, respectively.

(Table-form description of t6 status)

| | Data section | V | NID | ID |
|---|---|---|---|---|
| First-stage FIFO 211 | A2 | 1 | B | \ |
| Second-stage FIFO 212 | A1 | 1 | A | A |

(t7) In the bus control circuit 5, the host data 110 is transferred via the data interface 25 to the external I/F 4. Because storage of valid data in the second-stage FIFO 212 is known from the first-stage FIFO information signal 201 and the second-stage FIFO information signal 203, the FIFO control circuit 20 asserts the demodulated data write request 208 and the write ID signal 209 to the adjusting circuit 22.

The adjusting circuit 22 accepts the demodulated data write request. The result of adjustment 2010 is output to the access signal generating circuit 23, the address generating circuit 24, and the data interface 25, and first, the write operation of the demodulated data A1 into the buffer memory 2 is started for there machine cycles.

(t8) The access signal for the demodulated data write request 208 to the buffer memory 2 is generated at the access signal generating circuit 23, and the RAS 112 is asserted. In the address generating circuit 24, the write address of the demodulated data of kind A is selected, and the DRAM address 115 is output. Since the write request of data of the second-stage FIFO 212 has been accepted in the preceding cycle, on the other hand, the FIFO control circuit 20 asserts the write request 208 and the write ID signal 209 of the demodulated data A2 of the first-stage FIFO 200 are asserted to the adjusting circuit 22. However, because the demodulated data A1 of the preceding run is currently read, the write request of the data of the first-stage FIFO 211 is caused to wait.

(t9) The CAS 113 and the WE 114 are asserted from the access signal generating circuit 23, and the data A1 written from the data interface 25 in the buffer memory 2 is output to the DRAM data 116, thus completing write of the demodulated data A1.

(t10) Since write of the demodulated data has been completed in the preceding cycle, the content of the first-stage FIFO 211 is written in the second-stage FIFO 212. In the adjusting circuit 22, the write request of the demodulated data in writing state is accepted, and write operation of the demodulated data into the buffer memory 2 is started. Because the data kind of the demodulated data is the same as that in the preceding write, the address is continuous in principle.

In the access signal generating circuit 23, possibility of accessing the buffer memory 2 from the DRAM address 115 in a high-speed access mode (DRAM page mode) is detected, and the RAS 112, the CAS 113 and the WE 114 are asserted. The access is executed in a cycle, thus completing write operation of the demodulated data.

(Table-from description of t10 status)

| | Data section | V | NID | ID |
|---|---|---|---|---|
| First-stage FIFO 211 | — | 0 | — | \ |
| Second-stage FIFO 212 | A2 | 1 | B | A |

According to this embodiment, as described above, when the kind of the following demodulated data is the same, the buffer memory can be accessed immediately upon arrival of the following data, thus permitting use of the high-speed access mode of the buffer memory and hence reduction of the access time.

(Second Embodiment)

This embodiment covers a case where there are many data kinds and many FIFOs from a plurality of bundles of small FIFOs individually accessible, form multiple stages.

Figure 6:
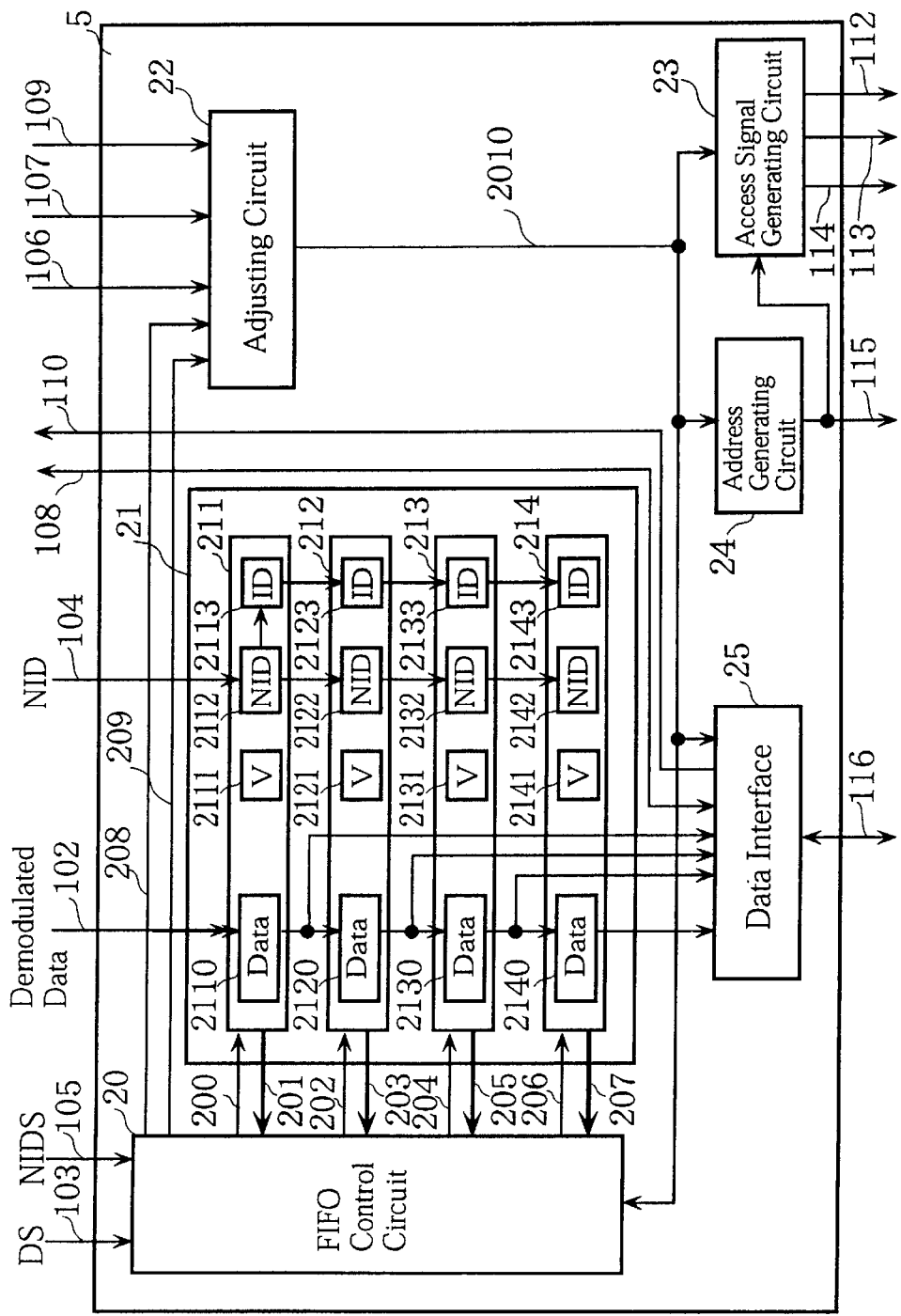
FIG. 6 is a configuration diagram of the bus control circuit of a second embodiment of the invention.

FIG. 6 schematically illustrates the configuration of the bus control circuit of this embodiment. In this embodiment as well, the bus control circuit 5 comprises an FIFO control circuit 20, an FIFO 21 storing demodulated data, an adjusting circuit 22 which adjusts access to the buffer memory, an access signal generating circuit 23 which generates an access signal to the buffer memory, an address generating circuit 24, and a data interface 25. The FIFO 21 comprises four stages or four bundles including a first-stage FIFO 211, a second-stage FIFO 212, a third-stage FIFO 213, and a fourth-stage FIFO 214, which can output internal data to the outside independently of the adjustment FIFOs for each stage.

The FIFO of each stage is composed of a data section 21M0 (where M=1 to 4; that is, 2110, 2120, 2130 and 2140; this applies also hereafter) which stores individual demodulated data; a validating section (V) 21M1 (M=1 to 4) which shows that the data stored in the data section 2110 is valid; and a next ID section (NID) 21M2 (M=1 to 4) which shows the kind of the following data transferred from the demodulating circuit, and has an ID section (ID) 21M3 (M=1 to 4) which shows the kind of data stored in the data section.

The FIFO control circuit 20 generates FIFO write control signals 200, 202, 204 and 206 for each stage from FIFO information pieces 201, 203, 205 and 207 and adjusting signal 2010, and controls write into each stage-FIFO. The FIFO control circuit 20, furthermore, outputs a demodulated data write request signal 208 which requests to write the demodulated data stored in these FIFO into the buffer memory 2, and a write ID signal 209 which shows the data kind of the demodulated data covered by the write request signal to the adjusting circuit 22.

Upon receipt of the demodulated data write request signal 208, the write ID signal 209, an error-corrected data request 106, a correction rewrite request 107 and a host data request 109, the adjusting circuit 22 adjusts accesses to the buffer memory in accordance with a predetermined adjusting priority, and outputs the result of adjustment 2010 to the FIFO control circuit 20, the access signal generating circuit 23, the address generating circuit 24 and the data interface 25.

Figure 7:
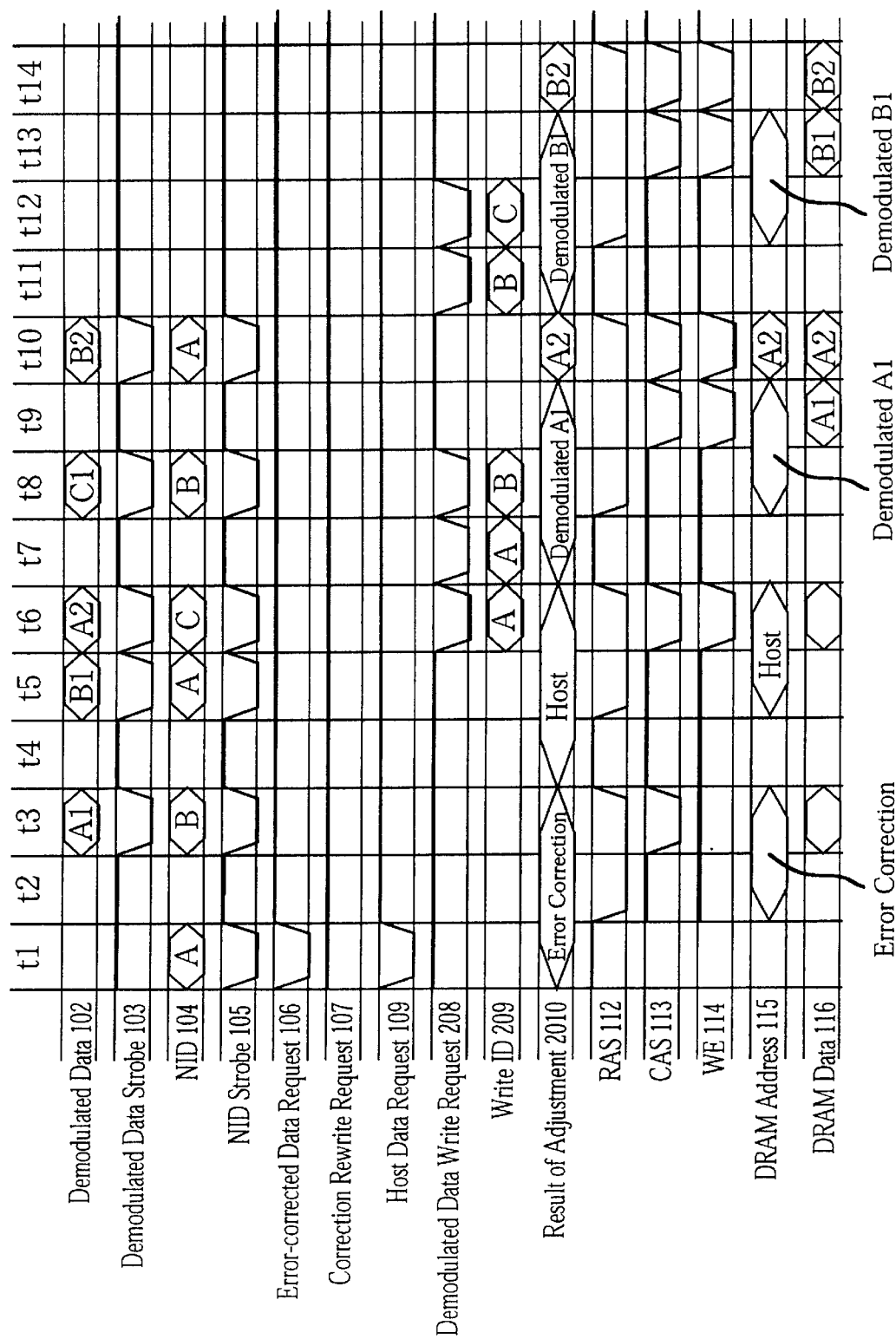
FIG. 7 is an operating timing chart of the data processing unit having the bus control circuit shown in FIG. 3.

Next, the operation of the data processing unit shown in FIGS. 2 and 6 will now be described in detail with reference to FIG. 7 illustrates operating timing of access to the buffer memory 2 in a case where the demodulated data are entered into the data processing unit in a sequence of data kinds of A, B, A, C and B, the data are read out from the buffer memory through continuous write of the demodulated data into the buffer memory each in an access, and assertion of the error-corrected data request 106 and the host data request 109 each once.

More specifically, FIG. 7 shows in detail, in units of machine cycles, the status of the demodulated data output from the demodulating circuit 1 shown in FIG. 2 to the bus control circuit 5, the demodulated data strobe 103, the NID 104, the NID strobe 105, the error-corrected data request 106, the correction rewrite request 107, and host data request 109, and access to the buffer memory. In this embodiment, all signals are active low signals showing that the signals have been asserted on a low level. Further, access to the buffer memory 2 is deemed to be three machine cycles for a usual access after adjustment at the adjusting circuit 52, and one machine cycle when using the high-speed access mode (DRAM page mode) for continuous addresses of the buffer memory 2.

Next, the demodulated data 102 are of three kinds including A, B and C, which are written in different areas of the buffer memory 2. The data of the same kind are written into the same area on the buffer memory to the continuous addresses in a single run of access, and are written in the high-speed access mode as a result.

As in the embodiment described above, the priority of adjustment in the adjusting circuit 52 is as follows: (1) write of the demodulated data; (2) readout of error-corrected data; (3) rewrite of corrected data; and (4) readout of host data, and adjustment is made at the time of starting the next access. The error-corrected data 108, the host data 110 and the DRAM data 116 have the same bus width, and access to the buffer memory 16 should be completed in a single run.

Control by the FIFO control circuit 50 in this embodiment is performed as follows. If there are two or more empty FIFOs, a write request of the demodulated data is made after waiting for the following data even when the following data is of a different kind. And, assertion of the write request of the demodulated data is limited to three requests including the currently executed one.

Operation of the data processing unit will now be described for each machine cycle (t1 to t14) along with the progress thereof. As in the preceding embodiment, contents of the demodulated data FIFO 21 for each cycle will be presented in a table form except for cycles in the same status as the previous cycle.

(t1) NID 104=A showing that the data kind of the demodulated data to be output next is A, and the NID strobe 105 are asserted from the demodulating circuit 1 to the bus control circuit 5. The error-corrected data request 106 is asserted from the error correcting circuit 3, and the host data request 109 is asserted from the external I/F 4.

In the bus control circuit 5, the first-stage FIFO write control signal 200 is output from the FIFO control circuit 20, and A is written into the NID section 2112 of the first-stage FIFO 211. Since there is not valid data in the FIFO, the validating sections (V) 2111 to 2141 are in the initial state of 0.

In the adjusting circuit 22, adjustment is made between the error-corrected data request 106 and the host data request 109. Because the error-corrected data request has a higher priority, the error-corrected data request is accepted, and the host data request is in waiting state. And, the result of adjustment 2010 is output from the adjusting circuit 22 to the access signal generating circuit 53, the address generating circuit 24, and the data interface 25, and read operation of the error-corrected data from the buffer memory 2 is started.

(Table-form description of t1 status)

|  | Data section | V | NID | ID |
|---|---|---|---|---|
| First-stage FIFO 211 | — | 0 | A | — |
| Second-stage FIFO 212 | — | 0 | — | — |
| Third-stage FIFO 213 | — | 0 | — | — |
| Fourth-stage FIFO 214 | — | 0 | — | — |

(t2) An access signal to the buffer memory 2 in response to the error-corrected data request 106 is generated in the access signal generating circuit 23, and the RAS 112 is asserted. The read address of the error-corrected data is selected in the address generating circuit 24, and the DRAM address 115 is output.

(t3) The demodulated data strobe 103 is asserted from the demodulating circuit 1 to the bus control circuit 5, and the demodulated data 102 (data is represented by A1) is output. Simultaneously with this, NID 104=B showing the next demodulated data 102 is of the kind B, and the NID strobe 105 is asserted. In the bus control circuit 5, the first-stage FIFO write control signal 200 is output from the FIFO control circuit 20. A1 is written in the data section 2110 of the first-stage FIFO 211; 1 is written in the validating section (V) 2111; B is written in the NID section 2112, and value A of the NID section immediately before is written in the ID section 2113.

The first-stage FIFO information signal 201 reveals that there is a valid data in the first-stage FIFO, and the kind of the stored data (ID=A) is different from the kind of the data transferred next (NID=B). However, when two or more stages of FIFO are empty, the FIFO control circuit 20 does not assert the demodulated data write request 208 until arrival of the next data, but waits for transfer of the next data. The CAS 113 is asserted from the access signal generating circuit 23, and the DRAM data 116 is output from the buffer memory 2, thus completing read operation of data for error correction.

(Table-form description of t3 status)

|  | Data section | V | NID | ID |
|---|---|---|---|---|
| First-stage FIFO 211 | A1 | 1 | B | A |
| Second-stage FIFO 212 | — | 0 | — | — |
| Third-stage FIFO 213 | — | 0 | — | — |
| Fourth-stage FIFO 214 | — | 0 | — | — |

(t4) The error-corrected data 108 is transferred to the error correcting circuit 3 via the data interface in the bus control circuit 5. The second-stage FIFO write control signal 202 is output from the FIFO control circuit 20, and the content of the first-stage FIFO 211 is written in. Simultaneously, the validating section (V) 2111 of the first-stage FIFO 211 is cleared to 0, which represents a state in which no valid data is present, and the value B of the NID section immediately before is written in the ID section 2113.

It is known from the second-stage FIFO information signal 203 that there is a valid data in the second-stage FIFO, and the data kind of the stored data (ID=A) is different from that of the data transferred next (NID=B). However, since three stages of FIFO are empty, the FIFO control circuit 20 does not assert the demodulated data write request 204, but waits for arrival of the following data.

The adjusting circuit 22 accepts the host data request 109 in the waiting state. The result of adjustment 206 is output from the adjusting circuit 22 to the access signal generating circuit 23, the address generating circuit 24, and the data interface 25, and read operation of the host data from the buffer memory 2 for three cycles is started.

(Table-form description of t4 status)

| Data section | V | NID | ID |
|---|---|---|---|
| First-stage FIFO 211 | — | 0 | — | B |
| Second-stage FIFO 212 | A1 | 1 | B | A |
| Third-stage FIFO 213 | — | 0 | — | — |
| Fourth-stage FIFO 214 | — | 0 | — | — |

(t5) The access signal to the buffer memory 2 in response to the host data request is generated at the access signal generating circuit 23, and the RAS 112 is asserted. The read address of the host data is selected at the address generating circuit 24, and the DRAM address 115 is output.

The demodulated data strobe 103 is asserted from the demodulating circuit 1 to the bus control circuit 5, and the demodulated data 102 (represented by B1) is output. Simultaneously, NID 104=A showing that the kind of the demodulated data 102 is A, and the NID strobe 105 are asserted. In the bus control circuit 5, the first-stage FIFO write control signal 200 is output from the FIFO control circuit 20. B1 is written in the data section 2110 of the first-stage FIFO 211; 1 is written in the validating section (V) 2111; A is written in the NID section 2112 and B is written in the ID section 2113, respectively.

Further, the third-stage FIFO write control signal 204 is output from the FIFO control circuit 20, and the content of the second-stage FIFO 212 is written in. Simultaneously with this, the validating section (V) 2121 of the second FIFO 212 is cleared to 0, which represents a state of absence of valid data. At this point, the FIFO control circuit 20 detects that the data transferred next from the first-stage FIFO information signal 201, and makes a judgement of executing write of the data A1 of the third-stage FIFO after arrival of the next data. (If the kind of data transferred next is not A, write of the data A1 of the third-stage FIFO is requested to the adjusting circuit 22.)

(Table-form description of t5 status)

| Data section | V | NID | ID |
|---|---|---|---|
| First-stage FIFO 211 | B1 | 1 | A | B |
| Second-stage FIFO 212 | — | 0 | — | — |
| Third-stage FIFO 213 | A1 | 1 | B | A |
| Fourth-stage FIFO 214 | — | 0 | — | — |

(t6) The CAS 113 is asserted from the access signal generating circuit 23, and the DRAM data 116 is output from the buffer memory 2, thus completing read operation of the host data.

The demodulated data strobe 103 is asserted from the demodulating circuit 1 to the bus control circuit 5, and the demodulated data 102 (represented by A2) is output. Simultaneously with this, NID 104=C showing that the kind of the next demodulated data 102 is C, and the NID strobe 105 are asserted. In the bus control circuit 5, the first-stage FIFO write control signal 200 is output from the FIFO control circuit 20. A2 is written in the data section 2110 of the first-stage FIFO 211; 1 is written in the validating section (V) 2111; C is written in the NID section 2112; and A is written in the ID section 2113 respectively.

And, the fourth-stage FIFO write control signal 206 is output from the FIFO control circuit 20, and the content of the third-stage FIFO 213 is written. Because the following data of kind A has been transferred, the FIFO control circuit 208 asserts the demodulated write request signal 20 and the write ID 209 to the adjusting circuit 22. Since the host data read operation is executed in the adjusting circuit 22, the demodulated data write request is in waiting state.

(Table-form description of t6 status)

| Data section | V | NID | ID |
|---|---|---|---|
| First-stage FIFO 211 | A2 | 1 | C | A |
| Second-stage FIFO 212 | B1 | 1 | A | B |
| Third-stage FIFO 213 | — | 0 | — | — |
| Fourth-stage FIFO 214 | A1 | 1 | B | A |

(t7) In the bus control circuit 5, the host data 110 is transferred to the host I/F 4 via the data interface 25. The adjusting circuit 22 accepts the demodulated data transfer request, and the result of adjustment 2010 is output to the access signal generating circuit 23, the address generating circuit 24, and the data interface 25. Write operation of the demodulated data A1 into the buffer memory 2 for three cycles is started. The FIFO control circuit 20 writes the content of the second-stage FIFO 212 into the third-stage FIFO 213, and the content of the first-stage FIFO 211 into the second-stage FIFO 212, respectively. Furthermore, since write operation of data kind A is in execution to the fourth-stage FIFO, the third-stage FIFO 213 is skipped, and the write request of the data of the second FIFO 212 of the data kind A and the write ID 209 are asserted.

(Table-form description of t7 status)

| Data section | V | NID | ID |
|---|---|---|---|
| First-stage FIFO 211 | — | 0 | — | C |
| Second-stage FIFO 212 | A2 | 1 | C | A |
| Third-stage FIFO 213 | B1 | 1 | A | B |
| Fourth-stage FIFO 214 | A1 | 1 | B | A |

(t8) The access signal to the buffer memory 2 in response to the demodulated data A1 write request is generated in the access signal generating circuit 23, and the RAS 112 is asserted. In the address generating circuit 24, the write address of kind A of the demodulated data is selected, and the DRAM address 115 is output. The demodulated data strobe 103 is asserted from the demodulating circuit 1 to the bus control circuit 5, and the demodulated data 102 (represented by C1) is output. Simultaneously, NID 104=B showing that the kind of the next demodulated data is B, and the NID stroke 105 are asserted. In the bus control circuit 5, the first-stage FIFO write control signal 200 is output from the FIFO control circuit 20. C1 is written in the data section 2110 of the first-stage FIFO 211; 1 is written in the validating section (V) 2111; B is written in the NID section 2112; and C is written in the ID section 2113 respectively. Because two or more stages of empty FIFOs are not present, and the kind of the following data is C, the FIFO control circuit 20 asserts the demodulated data write request signal 208 of B1 data stored in the third-stage FIFO 213, and the write ID 209 to the adjusting circuit 22.

(Table-form description of t8 status)

| | Data section | V | NID | ID |
|---|---|---|---|---|
| First-stage FIFO 211 | C1 | 1 | B | C |
| Second-stage FIFO 212 | A2 | 1 | C | A |
| Third-stage FIFO 213 | B1 | 1 | A | B |
| Fourth-stage FIFO 214 | A1 | 1 | B | A |

(t9) The CAS 113 and the WE 114 are asserted from the access signal generating circuit 23, and the data A1 stored in the data section of the fourth-stage FIFO 214 is selected from the data interface 25 and is output as the DRAM data 116, thereby completing write operation of this demodulated data A1.

(t10) As write of data A1 has been completed in the preceding cycle, the contents of the first to third FIFOs are written in the next-stage FIFOs. The demodulated data strobe 103 is asserted from the demodulating circuit 11 to the bus control circuit 5, and the demodulated data 102 (represented by B2) is output. Simultaneously with this, NID 104=A showing that the kind of the next demodulated data 102 is A, and the NID strobe 105 are asserted. In the bus control circuit 5, the first-stage FIFO write control signal 200 is output from the FIFO control circuit 20. B2 is written in the data section 2110 of the first-stage FIFO 211; 1 is written in the validating section (V) 2111; A is written in the NID section 2112; and B is written in the ID section 2113 respectively.

In the adjusting circuit 22, the A2 data write request in waiting state is accepted, and write operation of the demodulated data into the buffer memory 2 is started. At this point, since the kind of the demodulated data is the same as the kind of data written in the preceding cycle, data is written in the same area, and the addresses are continuous in principle. In the access signal generating circuit 23, possibility is detected to make an access in the high-speed access mode (DRAM page mode), and the RAS 112, CAS 113 and the WE 114 are asserted. In the data interface 25, A2 data of the data section 2130 of the third-stage FIFO 213 is selected and output to the DRAM data 116. Access is accomplished in one cycle, thus completing the write operation of the demodulated data.

(Table-form description of t10 status)

| | Data section | V | NID | ID |
|---|---|---|---|---|
| First-stage FIFO 211 | B2 | 1 | A | B |
| Second-stage FIFO 212 | C1 | 1 | B | C |
| Third-stage FIFO 213 | A2 | 1 | C | A |
| Fourth-stage FIFO 214 | B1 | 1 | A | B |

(t11) Because write of the data A2 has been completed in the preceding cycle, the content of the second-stage FIFO is written into the third-stage FIFO, and then, the content of the first-stage FIFO is written into the second FIFO. Then, because the data kind of the demodulated data written in the buffer memory 2 is B, the FIFO control circuit 20 skips the third-stage FIFO 213, and makes a write request of data B2 stored in the second-stage FIFO 212 to the adjusting circuit 22. The adjusting circuit 22 accepts the B1 demodulated data transfer request, and the result of adjustment 206 is output to the access signal generating circuit 23, the address generating circuit 24 and the data interface 25, thereby starting write operation of the demodulated data B1 into the buffer memory for three cycles.

(Table-form description of t11 status)

| | Data section | V | NID | ID |
|---|---|---|---|---|
| First-stage FIFO 211 | — | 0 | — | A |
| Second-stage FIFO 212 | B2 | 1 | A | B |
| Third-stage FIFO 213 | C1 | 1 | B | C |
| Fourth-stage FIFO 214 | B1 | 1 | A | B |

(t12) The access signal to the buffer memory 2 in response to the write request of the demodulated data B1 is generated in the access signal generating circuit 23, and the RAS 112 is asserted. The write address of kind B demodulated data is selected in the address generating circuit 24, and the DRAM address 115 is output. Furthermore, since two or more empty FIFOs are not present in the FIFO control circuit 20, the adjusting circuit 22 is requested to write C1 data of the third-stage FIFO 213 into the buffer memory 2 without waiting for the following data.

(t13) The CAS 113 and the WE 114 are asserted from the access signal generating circuit 23. The data (B1) stored in the data section of the fourth-stage FIFO 214 is selected from the data interface 25, and output as the DRAM data 116, thus completing write operation of the demodulated data.

(t14) Because write of B1 has been completed in the preceding cycle, the contents of the second to third-stage FIFOs are sequentially written in the following FIFOs. The adjusting circuit 22 accepts the B2 data write request in waiting stage, thereby starting write operation of the demodulated data B2 into the buffer memory 2. At this point, since the kind of the demodulated data is the same as that written in the preceding cycle, the data is written in the same area. The access signal generating circuit 23, detecting the possibility to make an access from the DRAM address 115 to the buffer memory 2 in the high-speed access mode (DRAM page mode), asserts the RAS 112, the CAS 113 and the WE 114. In the data interface 25, B2 data of the data section 2130 of the third-stage FIFO 213 is selected, and is output to the DRAM data. Access is accomplished in a single cycle, thus completing write operation of the demodulated data.

(Table-form description of t14 status)

| | Data section | V | NID | ID |
|---|---|---|---|---|
| First-stage FIFO 211 | — | 0 | — | A |
| Second-stage FIFO 212 | — | 0 | — | — |
| Third-stage FIFO 213 | B2 | 1 | A | B |
| Fourth-stage FIFO 214 | C1 | 1 | B | C |

According to this embodiment, as described above, when waiting for arrival of the next demodulated data until the number of empty FIFOs becomes two or less, and data of the same kind arrives, write of data of the same kind into the buffer memory is continuously executed by changing the sequence. As a result, it becomes possible to use the high-speed access mode to the buffer memory, thus permitting reduction of the access time.

(Third Embodiment)

This embodiment relates to an FIFO serving as temporary storage means.

Figure 8:
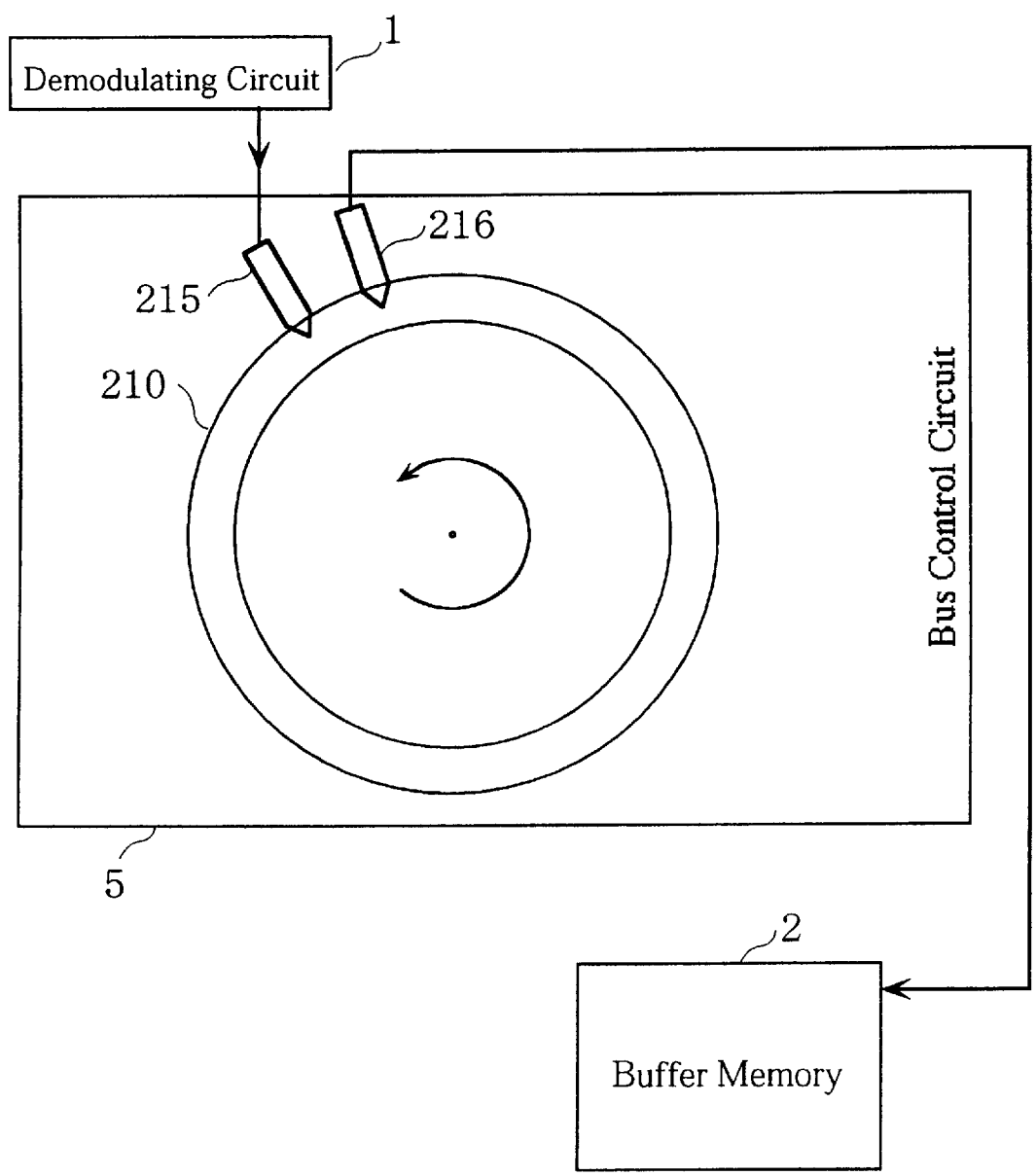
FIG. 8 conceptually illustrates the configuration of FIFO of a third embodiment of the invention.

While the FIFO shown conceptually in FIGS. 3 and 6 has rectangular shape, the FIFO of this embodiment has conceptually a doughnut shape as shown in FIG. 8. In FIG. 8, 210 represents a storage section serving as the FIFO main body storing the demodulated data and rotates conceptually anti-clockwise when writing or reading data as shown in FIG. 8; 215, a data writing arm; and 216, data reading arm. As a result, it is possible to overwrite-store the next transferred demodulated data, irrespective of the data kind while transferring the already stored data to the buffer memory 2 while rotating anti-clockwise.

Therefore, when the data of the same kind is transferred during transfer of the stored data to the buffer memory 2, it is possible to store the same in the demodulated data itself by continuing the anti-clockwise rotation, and to transfer in a high speed the transferred demodulated data to the buffer memory in succession to the data currently in transfer to the buffer memory.

If the next demodulated data is of a different kind, the demodulated data is not transferred in succession, although the anti-clockwise rotation is continued, and the only operation accomplished is to store the applicable data (together with the kind of the next demodulated data, the information showing validity, etc. depending on the cases).

It is needless to mention that the capacity of the FIFO main body of this embodiment is determined by taking account of the capacity of various demodulated data, the incoming frequency of transfer and the frequency of transfer to the buffer memory.

When the interval between demodulated data transferred from the demodulating means to the bus control means is approximately known for each data kind from the rotation speed of the optical disk, the data recording density and the kind of stored data such as image or music, it may be known to the bus control means that transfer from the demodulating circuit of the next data of the same kind is started immediately upon completion of transfer of the demodulated data currently in transfer to the buffer memory. In such a case, the data may be transferred to the buffer memory substantially in immediate succession. In this case, write may be made directly to the next address of the buffer memory without intermediary of the FIFO.

(Fourth Embodiment)

This is a variation of the second embodiment.

In this embodiment, each FIFO stores only demodulated data, and directly enters and outputs demodulated data without intermediary of any other FIFO. The bus control means has a memory storing data for controlling write into FIFO and read from FIFO, and a write/read data control section which rewrites the contents of the memory, as shown in FIG. 9.

Figure 9:
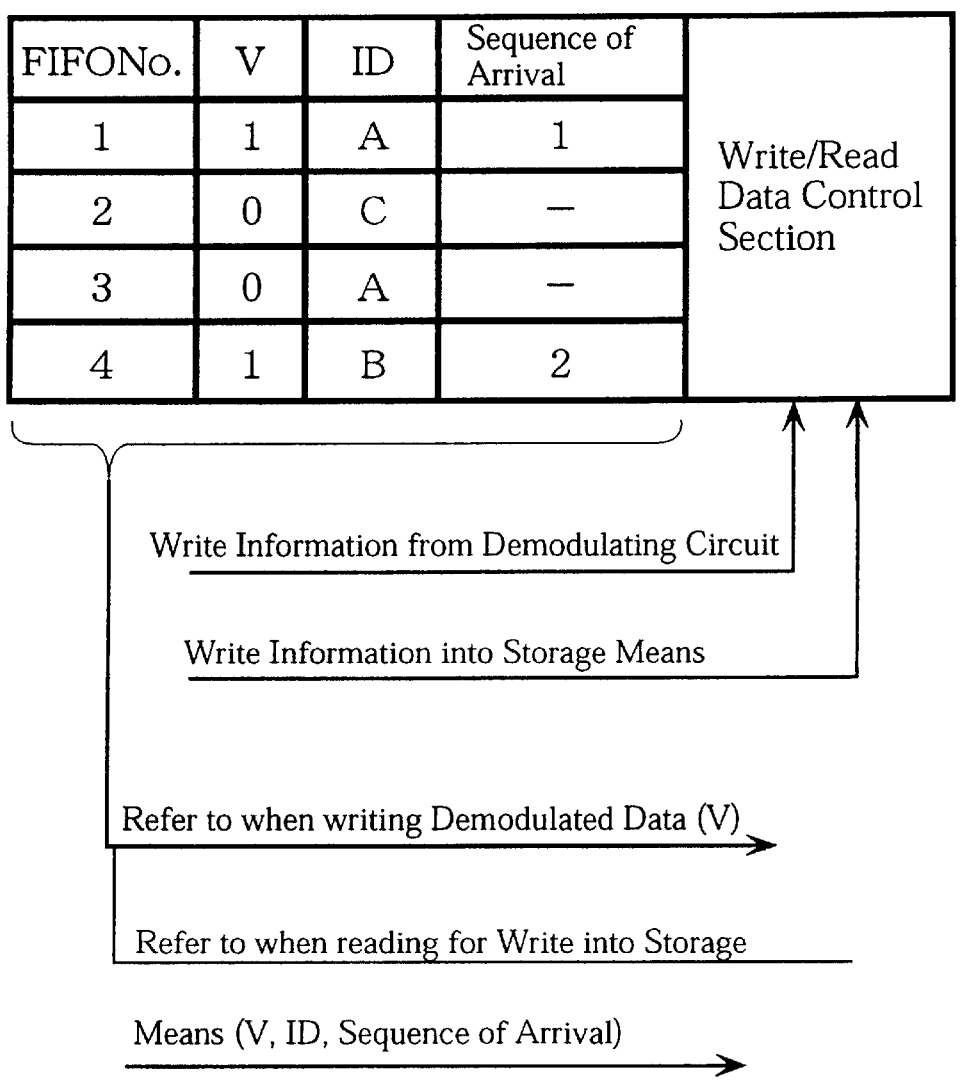
FIG. 9 conceptually illustrates a portion of a fourth embodiment of the invention.

Operation intrinsic to the data processing unit of this embodiment will now be described as shown below with reference to FIG. 10.

a1) The data kind of the next demodulated data is notified by the demodulating circuit.

a2) It is determined whether or not demodulated data of the same kind as that notified is stored in FIFO, as shown in FIG. 9.

a3) If stored, a request to write, in immediate succession in a single run of access, demodulated data of the same kind as that notified, stored in the FIFO, and then demodulated data of the same kind not as yet sent, into the storage means is issued at a good timing.

a4) An access OK signal is received.

a5) The two above-mentioned demodulated data are continuously written into the storage means.

a6) After the completion of write, that effect is notified to the write/read data control section as shown in FIG. 9, and simultaneously with this, the next processing including recognizing the demodulated data currently in transfer from the demodulating circuit is started.

a7) to a12) If not stored, and if the number of empty FIFOs is less than 1, a write request of only the demodulated data sent first into the storage means is issued and the same is written. If the number of empty FIFOs is two or more, issuance of a write request is restrained until the completion of receiving of the demodulated data currently in transfer. In the meantime, access is made from the other means to the storage means. After the completion of the above-mentioned processing, a processing similar to that described in a6) is performed.

Figure 10:
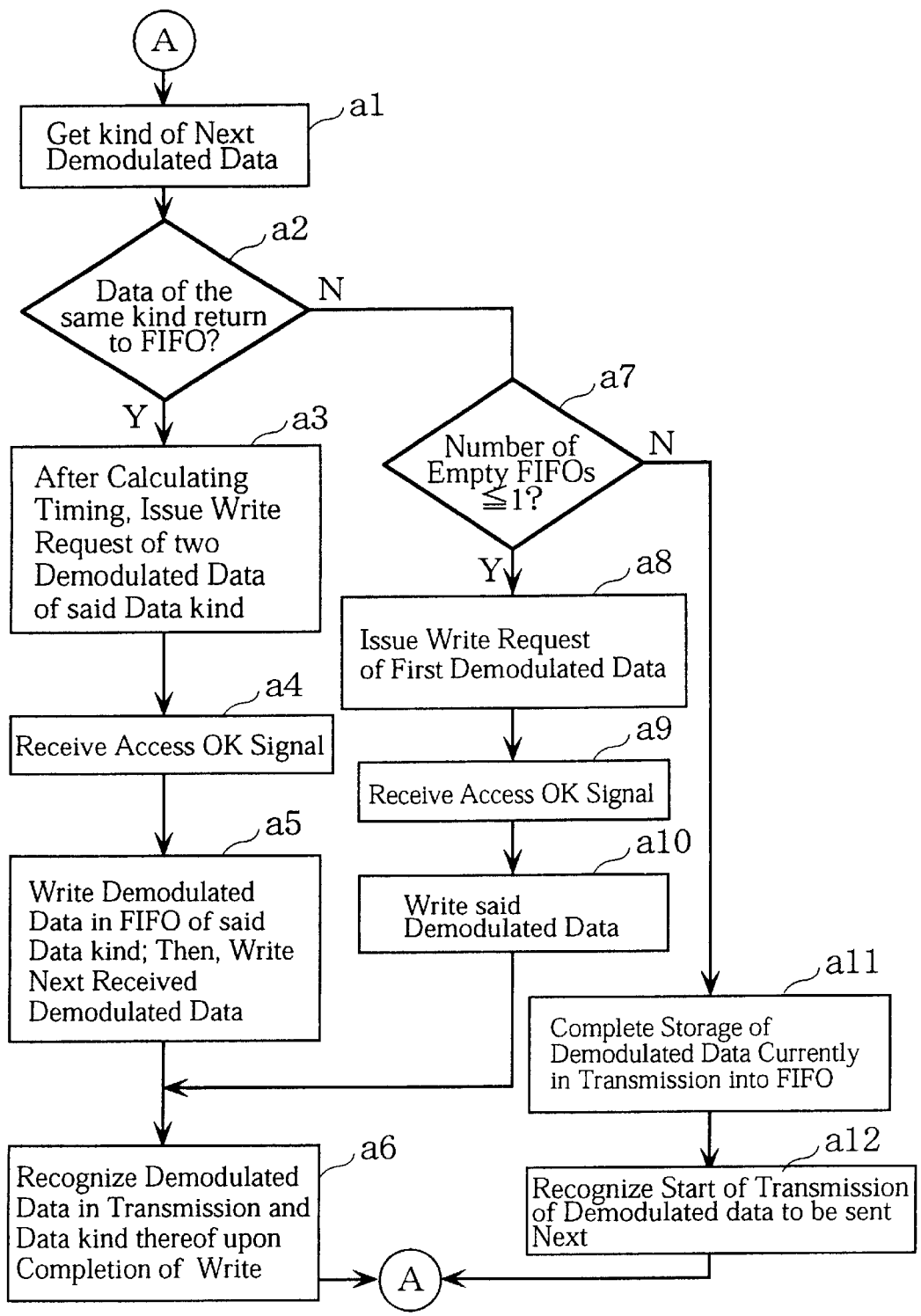
FIG. 10 illustrates important processing steps of the aforementioned embodiments.
Figure 11:
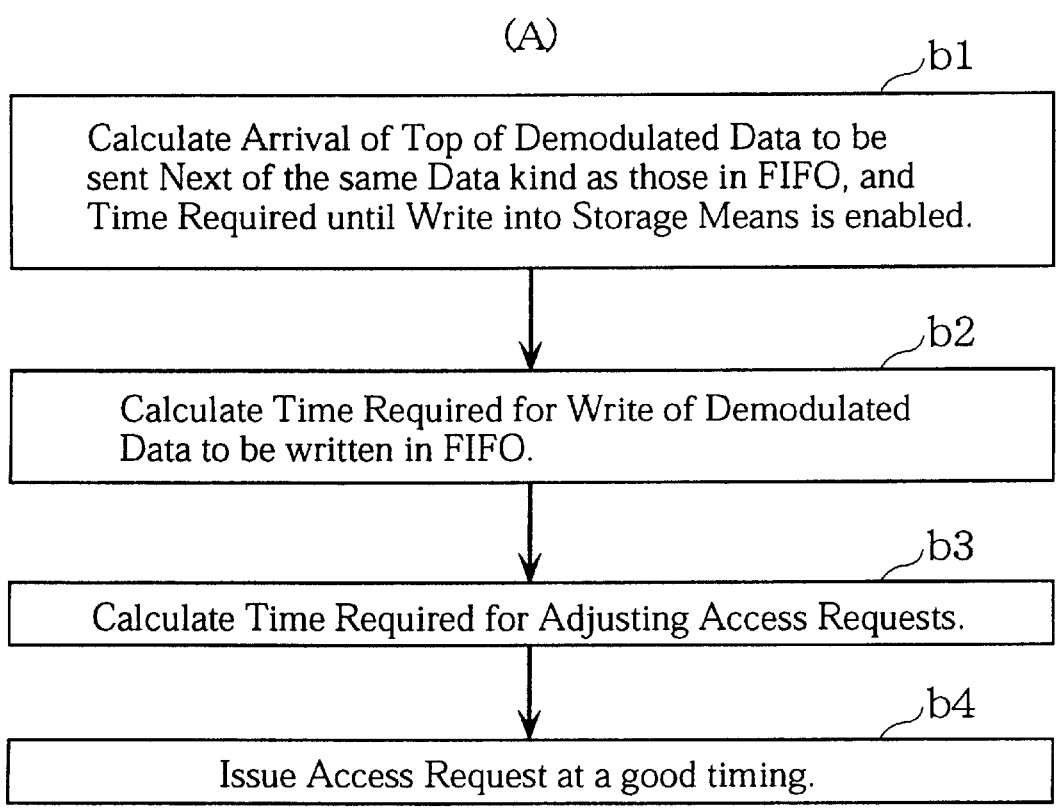
FIG. 11 illustrates processing steps accompanying the processing steps shown in FIG. 10.
Figure 11:
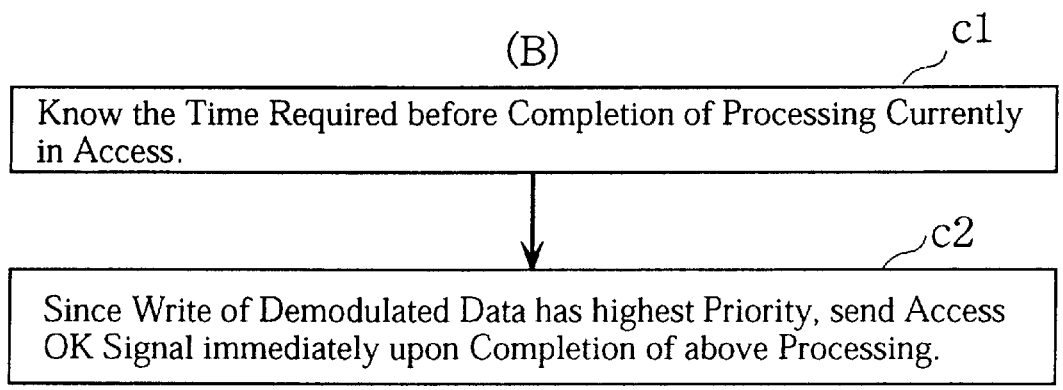

FIG. 11 illustrates a processing performed along with the processing as shown in FIG. 10.

FIG. 11(A) shows the procedure or contents of considerations upon issuing a request for writing the data of the same kind into the storage means in a single access at a good timing.

FIG. 11(B) shows the procedure or contents of considerations upon issuing an access OK response.

The present invention has been described by means of several embodiments. The invention is not of course limited by these embodiments. For example, the invention may be applied as follows.

1) Error correcting data or host data read out from the buffer for transfer may be directly transferred within the cycle in which the data was read out, not retaining once in a built-in latch and then transfer the same in the next cycle.

2) In the second embodiment, the data may be kept from advancing to the next stage for changing the write pointer, not proceeding to the next stage every time the following data is transferred (the process is closer to the fourth embodiment)

3) The demodulated data and NID showing the data kind of the data to be transferred next are not always to be output from the demodulating circuit to the bus control circuit at the same timing, but it is so arranged that the NID is output before the demodulated data.

4) The unit may have other components, and the number of access requests to the storage means to be adjusted of the bus control circuit may be more than four. Along with this, the number of FIFOs may be larger.

5) The error correcting means, if not detecting an error, may notify the external interface means and the like of the fact, and directly output the data currently retained in itself, not writing the data again into the storage means. Therefore, unnecessary data within the storage means are eliminated by overwriting of the data when the following data are read in for error correction.

6) After adjustment of the demodulated data currently in transmission, the next demodulated data of the same kind as that of the data already stored in the FIFO may be stored in the FIFO, and then, a write request of the two identical data may be issued. That is, simultaneous processing in parallel may be avoided.

As is understood from the above description, in the present invention, write in the buffer memory of the demodulated data of which transmission from the demodulating circuit has already been completed and stored in the temporary storage means is continuously performed in a single access, if the following data of the same kind is present, after waiting for the arrival of such data or after a prescribed amount of data has arrived, thus permitting use of the high-speed access mode.

What is claimed is:

1. A data processing unit comprising:

demodulating means for demodulating physical data, such physical data being read from a storage medium;

storage means for temporarily storing demodulated data in an area corresponding to a kind of such demodulated data, and for serving as a buffer at a time of error correction;

error correcting means for performing error detection and error correction on data read from said storage means, and for writing corrected data back into the storage means;

external interface means for reading corrected data from said storage means and outputting such read corrected data; and bus control means having access request adjusting sub-means for adjusting an access request requesting access to said, storage means in a prescribed priority, such request for writing demodulated data or corrected data into the storage means by the demodulating means and the error correcting means, for error correction by the error correcting means, and for data reading for data transfer by the external interface means, wherein:

said demodulating means comprising:

next cycle demodulated data kind information notifying sub-means for externally outputting next data kind information to said bus control means, output of such next data kind information being in accordance with output of a first demodulated data currently being transferred, and such next data kind information specifying a kind of second demodulated data to be transferred after such currently transferred first demodulated data; and said bus control means comprises:

temporary storage sub-means for temporarily storing, such first demodulated data currently transferred from said demodulating means, the temporary storage of such currently transferred first demodulated data being prior to writing thereof into said storage means; and same kind data continuous write control sub-means for issuing a write request for writing such currently transferred first demodulated data into said storage means, wherein when next data kind information sent in accordance with such currently transferred first demodulated data is different from a data kind of such first currently transferred demodulated data, said write control sub-means is for issuing a write request such that only such first currently transferred demodulated data be written into said storage means, the write request of such currently transferred first demodulated data being issued at a good timing; and when such data kinds for first and second demodulated data are the same, said write control sub-means is for allowing such first demodulated data previously stored in said temporary storage sub-means to be stored in said storage means and for issuing a write request for writing such second demodulated data into said storage means continuously in succession with such first demodulated data, and the write request of such second demodulated data being issued at a good timing.

2. The data processing unit according to claim 1, wherein:

said temporary storage sub-means is a FIFO for storing first demodulated data and kind information of second demodulated data to be demodulated and sent after such first demodulated data, wherein such first demodulated data and such kind information of such second demodulated data are transferred from said demodulating means; and said same kind data continuous write control sub-means is direct or single-FIFO-using same kind data continuous write control sub-means, wherein when data kinds of two demodulated data are the same, said write control sub-means is for transferring first demodulated data to said storage means, and after transfer of such first demodulated data, said control sub-means is for issuing a write request of such same kind second demodulated data, the write request thereof requesting that second demodulated data be transferred to said storage means continuously with the first demodulated in a single access, the write request of such second demodulated data requesting that such second demodulated data be transferred to said storage means directly of via said FIFO, and the write request of such second demodulated data being issued at a good timing.

3. The data processing unit according to claim 1, wherein said bus control means comprises:

a first FIFO for storing demodulated data, a kind of such stored demodulated data, and a kind of data next to be demodulated and sent, such demodulated data, such kind of such demodulated data, and such kind of data next to be demodulated all being transferred from said demodulating circuit; and a second FIFO, wherein when such data kind of such data next to be demodulated is the same as a data kind of demodulated data stored in said first FIFO, said second FIFO for storing such next to be demodulated data; and said same kind data continuous write control sub-means comprises 2FIFO-using same kind data continuous write control sub-means, wherein when data kinds of two demodulated data are the same, said write control sub-means is for writing demodulated data located in said first FIFO into said storage means, and then is for issuing a write request for writing demodulated data located in said second FIFO into said storage means continuously with preceding same kind demodulated data in a single access, the write request of such demodulated data located in said second FIFO being issued at a good timing.

4. The data processing unit according to claim 1, wherein:

said storage means is high-speed access mode applicable type storage means, comprising a high-speed access mode to subsequent addresses.

5. A data processing unit comprising:

demodulating means for demodulating physical data, such physical data being read from a storage medium;

storage means for temporarily storing demodulated data in an area corresponding to a kind of such stored data, and for serving as a buffer at a time of error correction and external transfer;

error correcting means for performing error detection and error correction on data read from said storage means, and for writing corrected data back into the storage means;

external interface means for reading corrected data from said storage means and externally outputting such corrected data; and bus control means having access request adjusting sub-means for adjusting, an access request requesting access to said storage means in a prescribed priority, the request for writing demodulated data or corrected data into the storage means by the demodulating means and the error correcting means, for error correction by the error correcting means, and for data reading for data transfer by the external interface means, wherein said demodulating means comprises:

next cycle demodulating data kind information notifying sub-means for outputting next data kind information to said bus control means, output of such next data kind information being in accordance with a first demodulated data currently being transferred, and such next data kind information specifying a kind of second demodulated data to be transferred after such currently transferred first demodulated data;

said bus control means comprises: bundled FIFO sub-means comprising a bundle of FIFOs each for sequentially storing current demodulated data and a data kind of such current demodulated data, the data kind of such current demodulated data having already been transferred in a previous cycle, and the sequential storage being performed upon every transfer of demodulated data from said demodulating means;

FIFO write control sub-means for performing write control such that current demodulated data and a data kind of such current demodulated data already transferred in the previous cycle are sequentially stored in one of said bundled FIFO sub-means, the sequential storage being performed for every demodulated data, and the write control being performed based on current demodulated data and next data kind information sent from said demodulating means, and on data kind of current demodulated data already transferred in the previous cycle;

prescribed sequence write control sub-means wherein when a number of empty FIFOs of said bundled FIFO sub-means is less than a prescribed number, said write control sub-means is for issuing a write request such that demodulated data stored in at least one FIFO of said FIFO sub-means is written into said storage means in a prescribed sequence, the write request of such demodulated data being issued at a good timing; and same kind data continuous write control sub-means, wherein when a prescribed number of same kind demodulated data are stored in FIFOs of said bundled FIFO sub-means, said write control sub-means is for issuing a write request such that the same kind demodulated data is written into an area of said storage means continuously in a sequence of arrival and in a single access, the area of said storage means corresponding to such same kind demodulated data, and the write request of such same kind demodulated data being irrespective of the number of empty FIFOs and issued in good timing.

6. The data processing unit according to claim 5, wherein:
said prescribed sequence write control sub-means comprises a continuous write care-type prescribed sequence write control sub-means, wherein said bundled FIFO sub-means comprises one empty FIFO, and when a data kind of demodulated data to be sent next is the same as a data kind of any demodulated data already stored in any of other FIFOs, then said write control sub-means is for not issuing a write request of such preceding same kind demodulated data until arrival of such next demodulated data, so that demodulated data to be sent next is written into said storage means continuously with such preceding same kind demodulated data, the one empty FIFO not having contents currently being written.

7. The data processing unit according to claim 5, wherein:
said bundled FIFO sub-means is data kind corresponding bundled FIFO means comprising a quantity of FIFOs one higher than a quantity of data kinds to be demodulated.

8. The data processing unit according to claim 7, wherein:
said storage means is high-speed access mode applicable type storage means comprising a high-speed access mode to subsequent addresses.

9. The data processing unit according to claim 7, wherein:
said same kind data continuous write control sub-means is arrival same kind data continuous write control sub-means wherein when second demodulated data is sent from said demodulated means after first demodulated data is currently written into said storage means, and when such sent second demodulated data is of a same data kind as such currently written first demodulated data, then said write control sub-means is for issuing a write request for writing such sent second demodulated data into said storage means in a single access and continuously with such first currently written demodulated data or with demodulated data following such first currently written demodulated data, and having a same data kind as such first currently written demodulated data and such sent second demodulated data.

10. The data processing unit according to claim 9, wherein:
said storage means is high-speed access mode applicable type storage means comprising a high-speed access mode to subsequent addresses.

11. The data processing unit according to claim 7, wherein:
said demodulating means comprises three data kind demodulating means for demodulating three kinds of data.

12. The data processing unit according to claim 11, wherein:
said storage means is high-speed access mode applicable type storage means comprising a high-speed access mode to subsequent addresses.

13. A data processing unit according to claim 11, wherein:
said same kind data continuous write control sub-means is arrival same kind data continuous write control sub-means, wherein when second demodulated data is sent from said demodulating means after first demodulating data is currently written into said storage means, and when such sent second demodulated data is of a same data kind as such currently written first demodulated data, then said write control sub-means is for issuing a write request for writing such sent second demodulated data into said storage means in a single access and continuously with such first currently written demodulated data or with demodulated data following such first currently written demodulated data and having a same data kind as such first currently written demodulated data and such sent second demodulated data.

14. The data processing unit according to claim 13, wherein:
said storage means is high-speed access mode applicable type storage means comprising a high-speed access mode to subsequent addresses.

15. The data processing unit according to claim 5, wherein:
said demodulating means comprises three data kind demodulating means for demodulating three kinds of data.

16. The data processing unit according to claim 15, wherein:
said same kind data continuous write control sub-means is arrival same kind data continuous write control sub-means wherein when second demodulated data is sent from said demodulating means after first demodulated data is currently written into said storage means, and when such sent second demodulated data is of a same data kind as such currently written first demodulated data, then said write control sub-means is for issuing a write request for writing such sent second demodulated data into said storage means in a single access and continuously with such first currently written demodulated data or with demodulated data following such first currently written demodulated data and having a same data kind as such first currently written demodulated data and such sent second demodulated data.

17. The data processing unit according to claim 16, wherein:
said storage means is high-speed access mode applicable type storage means comprising a high-speed access mode to subsequent addresses.

18. The data processing unit according to claim 15, wherein:
said storage means is high-speed access mode applicable type storage means comprising a high-speed access mode to subsequent addresses.

19. The data processing unit according to claim 5, wherein:
said same kind data continuous write control sub-means is arrival same kind data continuous write control sub-means wherein when second demodulated data is sent from said demodulating means after first demodulated data is currently written into said storage means, and when such sent second demodulated data is of a same data kind as such currently written first demodulated data, then said write control sub-means is for issuing a write request for writing such sent second demodulated data into said storage means in a single access and continuously with such first currently written demodulated data or with demodulated data following such first currently written demodulated data, and having a same data kind as such first currently written demodulated data and such sent second demodulated data.

20. The data processing unit according to claim 19, wherein:
said storage means is high-speed access mode applicable type storage means comprising a high-speed access mode to subsequent addresses.

21. A data processing unit comprising demodulating means which demodulates physical data, such physical data being read from a storage medium;
storage means for temporarily storing demodulated data in an area corresponding to a kind of such stored data, and for serving as a buffer at a time of error correction and external transfer;
error correcting means for performing error detection and error correction on data read from the storage means, and for writing corrected data back into said storage means;

external interface means for reading corrected data from the storage means and externally outputting such corrected data; and bus control means having access request adjusting sub-means for adjusting an access request requesting access to said storage means in a prescribed priority, such request for writing demodulated data and corrected data into the storage means by the demodulating means and the error correcting means, for error correction by the error correcting means, and for data reading for data transfer by the external interface means; wherein said demodulating means comprises:
a next cycle demodulating data kind information notifying sub-means for outputting next data kind information to said bus control means, the output of such next data kind information being in accordance with a first demodulating data currently being transferred, and such next data kind information specifying a kind of second demodulated data to be transferred after such currently transferred first demodulating data; said bus control means comprising:
bundled FIFO sub-means comprising at least three FIFOs for storing demodulated data transferred from said demodulating means, each of said FIFOs being capable of outputting data directly to said storage means;
FIFO input/output data storage sub-means for storing a kind of demodulated data stored in a FIFO, of said bundled FIFO sub-means, information about an ordinal position of transfer of such demodulated data, and information about a number of empty FIFOs, the storage by said FIFO input/output data storage sub-means being performed upon every outputting of demodulated data to allow such demodulated data to be stored into any of said FIFOs and upon every outputting of stored demodulated data to allow such data to be written into a temporary storage means;
FIFO output control sub-means wherein:
when said FIFO input/output data storage sub-means is not for storing demodulated data of a same data kind as second demodulated data sent from said storage means, and when at least one empty FIFO is less than a prescribed number, then said FIFO output control sub-means is for issuing a write request such that demodulated data stored in said FIFOs is written in said storage means in a sequence of transfer, the write request of such demodulated data being issued at a good timing; and
when at least one empty FIFO is present in a prescribed number, then said FIFO output control sub-means is for interrupting issuance of an output request such that such demodulated data is output to said storage means; the interruption of the issuance of an output request being until completion of arrival of first demodulated data being sent from said demodulating means; and
same kind data continuous write control sub-means, wherein when any FIFO of said bundled FIFO sub-means stores demodulated data of a same kind as such second demodulated data then said FIFO output control sub-means is for issuing a write request such that the same kind demodulated data be written continuously in an area of said storage means in a sequence of arrival and in a single access, the area of said storage means corresponding to a data kind of such demodulated data, and the write request of such same kind demodulated data being issued at a good timing.

22. The data processing unit according to claim 21, wherein:
said storage means is a high-speed access mode applicable type storage means comprising a high-speed access mode to the subsequent addresses.

* * * * *